US009552514B2

(12) United States Patent
Zhao et al.

(10) Patent No.: US 9,552,514 B2
(45) Date of Patent: Jan. 24, 2017

(54) MOVING OBJECT DETECTION METHOD AND SYSTEM

(71) Applicants: Ying Zhao, Beijing (CN); Liyan Liu, Beijing (CN); Lingyan Liang, Beijing (CN)

(72) Inventors: Ying Zhao, Beijing (CN); Liyan Liu, Beijing (CN); Lingyan Liang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 226 days.

(21) Appl. No.: 14/461,558

(22) Filed: Aug. 18, 2014

(65) Prior Publication Data
US 2015/0055828 A1 Feb. 26, 2015

(30) Foreign Application Priority Data

Aug. 21, 2013 (CN) .......................... 2013 1 0365452

(51) Int. Cl.
*G06K 9/00* (2006.01)
*G06T 7/00* (2006.01)
(Continued)

(52) U.S. Cl.
CPC ........... *G06K 9/00355* (2013.01); *G01S 17/50* (2013.01); *G06T 7/20* (2013.01); *G06T 7/204* (2013.01);
(Continued)

(58) Field of Classification Search
CPC ............ G06T 2207/10028; G06T 2207/30192; G06T 7/20; G06T 7/2006; G06K 9/00355
See application file for complete search history.

(56) References Cited

U.S. PATENT DOCUMENTS 6,496,598 B1 * 12/2002 Harman ............. H04N 13/0022
348/E13.004
6,498,628 B2 * 12/2002 Iwamura ................ G08C 23/00
345/157

(Continued)

FOREIGN PATENT DOCUMENTS

CN 101437124 A 5/2009
WO WO 2011/045789 A1 4/2011

OTHER PUBLICATIONS

"Principal component analysis," [online], Wikipedia, the free encyclopedia, [Searched Jul. 29, 2014], the Internet URL: http://zh.wikipedia.org/wiki/%E4%B8%BB%E6%88%90%E5%88%86%E5%88%86%E6%9E%90 (with English Translation).

*Primary Examiner* — Utpal Shah
(74) *Attorney, Agent, or Firm* — Harness, Dickey & Pierce, P.L.C.

(57) ABSTRACT

A moving object detection method includes acquiring two depth image frames including depth information, which are obtained by continuously taking images of a moving object, the two depth image frames including a present depth image frame and at least one past depth image frame; dividing each of the two depth image frames into a plurality of blocks; calculating differences between numbers of pixels positioned in respective different depth areas in each of the plurality of blocks in the present depth image frame, and numbers of pixels positioned in respective different depth areas in each of the corresponding plurality of blocks in each of the at least one past depth image frame, which correspond to the plurality of blocks in the present depth image frame; and detecting a moving block in the present depth image frame based on the calculated difference and constituting the detected moving object.

14 Claims, 8 Drawing Sheets

(51) Int. Cl.
*G01S 17/50* (2006.01)
*G06T 7/20* (2006.01)

(52) U.S. Cl.
CPC ... *G06T 7/2006* (2013.01); *G06T 2207/10028* (2013.01); *G06T 2207/20021* (2013.01); *G06T 2207/30196* (2013.01)

(56) References Cited

U.S. PATENT DOCUMENTS

| | | |
|---|---|---|
| 8,374,423 B2 | 2/2013 | Lee et al. |
| 9,111,351 B2 * | 8/2015 | Martensson .......... G06T 7/0075 |
| 2011/0080336 A1 * | 4/2011 | Leyvand ............... G06T 7/0046 345/156 |
| 2011/0081044 A1 * | 4/2011 | Peeper ................. G06T 7/0081 382/103 |
| 2011/0150271 A1 * | 6/2011 | Lee .................... G06K 9/00335 382/103 |

* cited by examiner

SCENE INCLUDING HUMAN
101 DEPTH CAMERA
102 COMPUTER

EXAMPLE OF SPACE HISTOGRAM

EXAMPLE OF TIME HISTOGRAM

MOVING OBJECT DETECTION METHOD AND SYSTEM

BACKGROUND OF THE INVENTION

1. Field of the Invention

The present invention relates to a moving object detection method and system, and more specifically to a technology of detecting a human hand based on depth information of stereoscopic vision.

2. Description of the Related Art

The detection of a moving object is one aspect of studies regarding a planar image process and a stereoscopic vision process. By detecting a different moving object, it is possible to implement a series of subsequent controls and operations, based on the detection of the different moving object. Specifically, for example, at present, the control of gestures based on stereoscopic vision is widely applied to various types of intelligent equipment, television sets, and game consoles. Gesture control is based on detection of a human hand. In the interaction process between a human and a computer, a human hand is typically continuously moving; however, there are cases where the hand stays at a certain position for a while. For example, an interaction system uses the staying time of the hand to trigger a single event. Therefore, it is necessary to detect a moving object such as a human hand, such that subsequent operations and interactions are accurately implemented.

In Chinese Patent Publication No. CN101437124A, the invention of which was invented by CHUNLIN LI and JIN WANG, disclosed on May 20, 2009, titled "Method for processing dynamic gesture identification signal facing (to) television set control", a method for processing dynamic gesture identification signals for television set control is introduced. This method includes collecting user motion images in front of a television by using a camera built in the television, acquiring a moving object by analyzing the collected images, extracting information of a hand target from the moving object and generating a trajectory, and subsequently determining an instruction corresponding to the trajectory and generating a television control instruction. More specifically, this method includes constructing a background image by using an average value of a grayscale image of a continuous multi-frame, calculating the difference between the present frame and the background image and acquiring a plurality of objects, and analyzing the trajectories of these objects and determining the parts of the body to which these objects belong. When the trajectory in a certain area matches a feature that is defined in advance, it is determined that this area is the area where the hand is located. The feature defined in advance is constructed based on the assumption that the movement of the hand is more rapid than the movement of the head, and within a certain range of a distance between the hand and the head. U.S. Pat. No. 8,374,423B2, the invention of which was invented by Lee et. al., granted on Feb. 12, 2013, and titled "Motion Detection Using Depth Images", introduces a moving object detection method based on a depth image, which includes setting an average value of depth images of a continuous multi-frame as a single reference image, obtaining the difference between the present depth image frame and the reference image in units of pixels and acquiring a moving image, and then determining the object to which the pixel belongs in the moving image. This method is for controlling an application by using position information of the moving object.

PCT Patent Publication No. WO2011045789, the invention of which was invented by Perski et. al., disclosed on Apr. 21, 2011, and titled "Computer Vision Gesture Based Control of a Device", introduces a gesture control method. This method includes obtaining the difference between two frames of a 2D or 3D image and acquiring the difference image, detecting the edge in the image and acquiring an outline, and comparing the detected outline with a hand part outline model. This method requires that the user's hand is open and directly facing the camera, and the fingers of the hand are extended.

By a typical movement estimation method, it is not possible to accurately acquire the moving object that is the human hand. Furthermore, for example, when other parts of the body move (for example, the arm moves), the calculation of the moving object that is the human hand may not be sufficiently accurate. Therefore, there is a need for a technology to detect the moving object that is a human hand more accurately.

SUMMARY OF THE INVENTION

The present invention provides a moving object detection method and system, in which one or more of the above-described disadvantages are eliminated.

According to an aspect of the present invention, there is provided a moving object detection method including acquiring at least two depth image frames including depth information, which are obtained by continuously taking images of a moving object, the at least two depth image frames including a present depth image frame and at least one past depth image frame; dividing each of the at least two depth image frames into a plurality of blocks; calculating differences between numbers of pixels positioned in respective different depth areas in each of the plurality of blocks in the present depth image frame, and numbers of pixels positioned in respective different depth areas in each of the corresponding plurality of blocks in each of the at least one past depth image frame, which correspond to the plurality of blocks in the present depth image frame; and detecting a moving block in the present depth image frame based on the calculated difference, and constituting the detected moving object, with the moving block.

According to an aspect of the present invention, there is provided a moving object detection system including an acquisition device configured to acquire at least two depth image frames including depth information, which are obtained by continuously taking images of a moving object, the at least two depth image frames including a present depth image frame and at least one past depth image frame, and to divide each of the at least two depth image frames into a plurality of blocks; a calculation device configured to calculate differences between numbers of pixels positioned in respective different depth areas in each of the plurality of blocks in the present depth image frame, and numbers of pixels positioned in respective different depth areas in each of the corresponding plurality of blocks in each of the at least one past depth image frame, which correspond to the plurality of blocks in the present depth image frame; and a detection device configured to detect a moving block in the present depth image frame based on the calculated difference, and to constitute the detected moving object, with the moving block.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of specific embodiments of the present invention. Although the present invention is described according to specific embodiments, the present invention is not limited to these embodiments. Conversely, the present invention encompasses variations, modifications, and equivalents without departing form the scope of the present invention. It is to be noted that the method steps described herein may be implemented by any of the functional blocks or functional installations, and the functional blocks or functional installations may be realized by physical entities or logical entities, or by a combination of physical entities and logical entities.

For the better understanding of those skilled in the art, a detailed description is given of the present invention with reference to drawings and specific embodiments.

Figure 1:
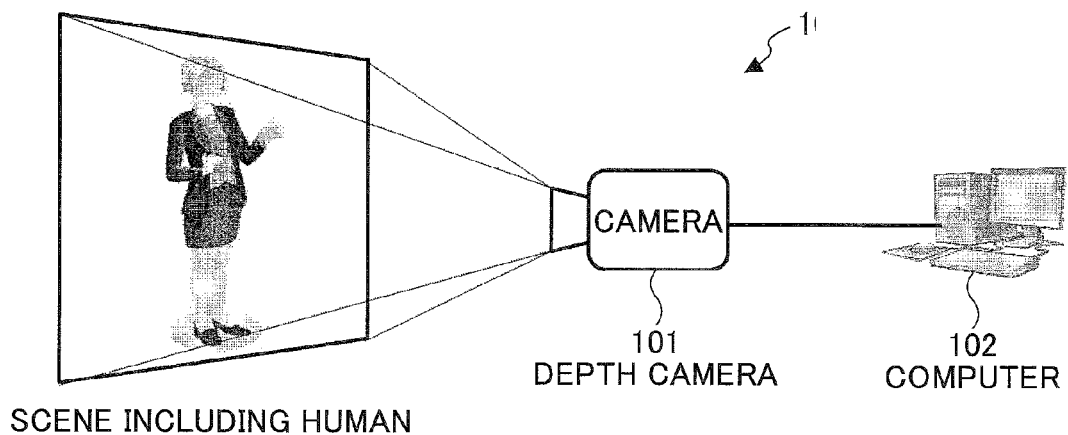
FIG. 1 illustrates an example of an application scene according to an embodiment of the present invention.

FIG. 1 illustrates an example of an application scene according to an embodiment of the present invention. A scene 100 includes a depth camera 101 for acquiring a depth map including depth information by taking an image of a scene including a person, and a computer 102 for processing the depth map that has been taken and detecting a moving object, performing interaction instruction identification of a human and a computer, and performing a subsequent process such as interaction feedback of a human and a computer. The depth camera 101 may be a camera for providing arbitrary scene depth information, such as a prime sensor, Kinect, etc. In the application scene of FIG. 1, the user can use gestures of a moving human hand to control programs or applications of interactions between the human and the computer in the computer 102. In an embodiment of the present invention, for example, it is possible to detect the position and the movement of the moving object that is a human hand in each application scene, the detected movement of the moving body of the human hand can be set as an input instruction of programs or applications of interactions between a human and a computer, and an output result of the programs or applications of interactions between a human and a computer can be acquired (for example, as in Kinect and Wii, it is controlled whether to make a confirmation, and operations for a game are controlled). An application in which embodiments of the present invention are accumulated, can be used in a system, in which the initialization is based on trajectory control. More specifically, the computer 102, having installed an application in which embodiments of the present invention are accumulated, can analyze each frame of the depth image and color images taken by the depth camera 101, and output the position information and the movement state of the moving object that is the human hand of the user. As a matter of course, the application scene of FIG. 1 is merely an application example of an embodiment of the present invention, and does not limit the scope of the present invention; another application scene that is different from the application scene in FIG. 1 may be used in actual applications.

Figure 2:
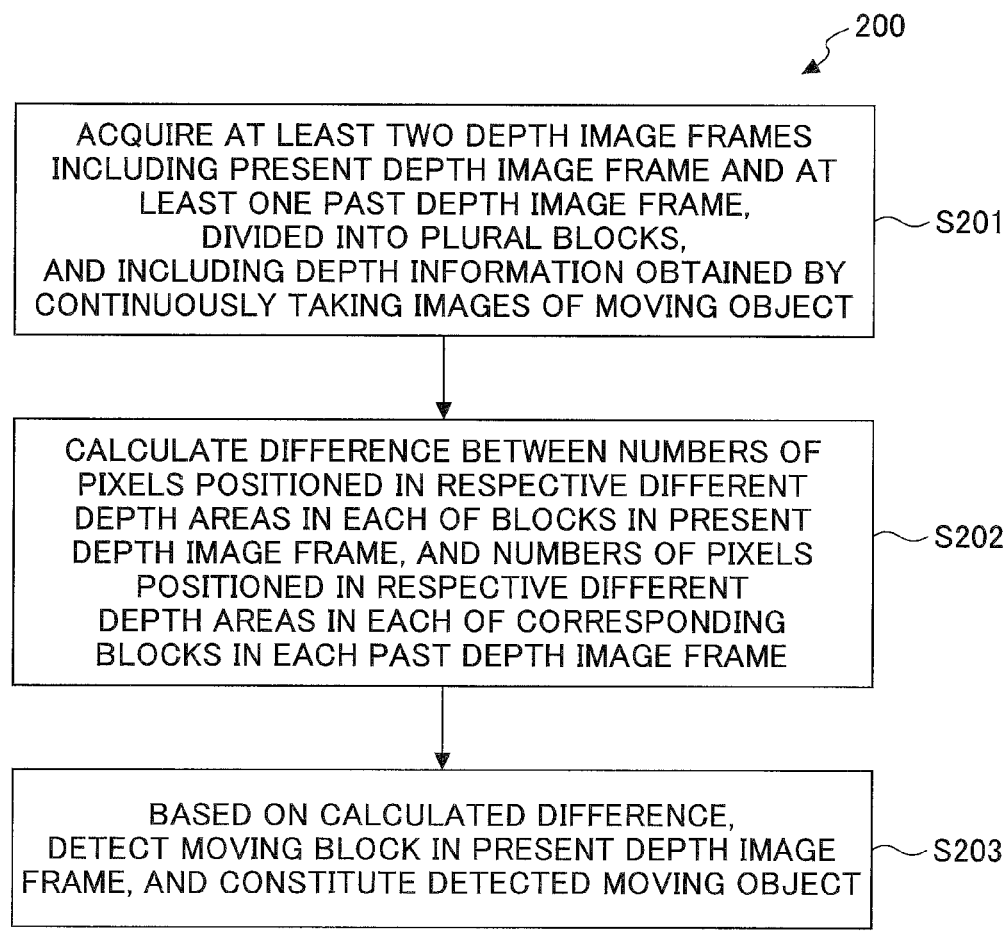
FIG. 2 is a flowchart of an example of a moving body detection method according to an embodiment of the present invention.

FIG. 2 is a flowchart of an example of a moving body detection method 200 according to an embodiment of the present invention.

The moving body detection method 200 illustrated in FIG. 2 includes acquiring at least two depth image frames having depth information, which are obtained by continuously taking images of a moving object. The at least two depth image frames include the present depth image frame and at least one past depth image frame. Each of the at least two depth image frames is divided into a plurality of blocks (step S201). The difference between numbers of pixels positioned in respective different depth areas in each of the blocks in the present depth image frame, and numbers of pixels positioned in respective different depth areas in each of the corresponding blocks in each past depth image frame, are calculated (step S202). Based on the calculated difference, a moving block in the present depth image frame is detected, and the detected moving object is constituted (step S203).

In an embodiment, each of the at least two depth image frames may be divided into a plurality of blocks by 10 pixels×10 pixels. As a matter of course, 10 pixels×10 pixels is one example; in other embodiments, the blocks may have other sizes, and the blocks do not necessarily need to be square blocks; the blocks may have various shapes such as a rectangle, a circle, and an oval.

Here, the "depth area" means a plurality of depth areas, which are formed by arranging the continuous depths in an ascending order in each block, and dividing (equally or unequally) the blocks into a plurality of areas. The "numbers of pixels positioned in respective different depth areas" means the number of pixels having the depth of the depth area, according to the depth image. For example, there may be a total of nine depth areas in each block in the depth image, of 0-0.1, 0.1-0.2, 0.2-0.3 . . . 0.8-0.9 (the depth areas may be divided in units of meters, etc., or the depth areas may be standardized, and therefore the scales of the depth areas are unrelated to a specific unit, and only express ratios). For example, there are two pixels positioned in the depth area 0-0.1, and among these two pixels, it is assumed that one pixel has a depth of 0.02, and one pixel has a depth of 0.08. There are two pixels positioned in the depth area 0.1-0.2, and among these two pixels, it is assumed that one pixel has a depth of 0.15, and one pixel has a depth of 0.16. There are four pixels positioned in the depth area 0.8-0.9, and among these four pixels, it is assumed that one pixel has a depth of 0.85, one pixel has a depth of 0.83, one pixel has a depth of 0.84, and one pixel has a depth of 0.89 (for example, as illustrated in FIGS. 3C and 3D). The specific depth areas and numbers of pixels are only examples, and the embodiment is not so limited. The areas may be divided equally as described above, or may be divided unequally, and the embodiment is not so limited. Accordingly, it is possible to acquire the numbers of pixels positioned in respective different depth areas in each block of the present depth image frame. With respect to the numbers of pixels positioned in respective different depth areas in a corresponding block of each past depth image frame, it is assumed that there are an N number of past depth image frames (N being a positive integer), that is to say, there are N depth image frames before the present depth image frame. Similarly, it is possible to acquire the numbers of pixels positioned in respective different depth areas in each corresponding block in each of the N number of past depth image frames. As a matter of course, when detecting a moving block in the present depth image frame, at least one past depth image frame is necessary, and therefore, the detection of the moving object is usually started from the second frame.

Usually, when an object moves, the numbers of pixels positioned in respective different depth areas in each block usually changes among adjacent frames or more frames (the present depth image frame and an N number of past depth image frames). When the object moves, the depth of a small part usually changes, and therefore the number of pixels positioned in the same depth area usually changes. Thus, the difference between numbers of pixels positioned in respective different depth areas in each of the blocks in the present depth image frame, and numbers of pixels positioned in respective different depth areas in each of the corresponding blocks in each past depth image frame, is observed, each moving block is detected in the present depth image frame, and a detected moving object is constituted by the detected moving blocks.

Therefore, the difference between numbers of pixels positioned in respective different depth areas in each of the blocks in the present depth image frame, and numbers of pixels positioned in respective different depth areas in each of the corresponding blocks in each past depth image frame, is observed, small moving blocks are detected, and these moving blocks are combined in several moving areas, so that it is possible to estimate the position where the moving object is located.

Usually, there is a difference between numbers of pixels positioned in respective different depth areas in each of the blocks in the present depth image frame, and numbers of pixels positioned in respective different depth areas in each of the corresponding blocks in each past depth image frame, or the difference may be relatively large, and it is considered that the block moves in either case. This difference is quantified, and a threshold is obtained, and the detection and the determination standard area are unified while avoiding measurements or calculation errors. Therefore, in one embodiment, step S203 of detecting the moving block in the present depth image frame based on the degree of the difference, and constituting the detected moving object, may include step S2031 (not shown) of quantifying the difference of the above blocks and calculating the movement level (extent of movement) of the block in the present depth image frame, and step S2032 (not shown) of detecting a block and setting the detected block as a moving block, when the movement level of the block is greater than or equal to a first predetermined threshold.

Furthermore, during the interaction between a human and a computer of a game console, when it is found that the movement of the human hand is greater than the movement of other parts of the body (for example, the arm), the special properties of this movement of the human hand are considered, and it is possible to estimate the area where the moving object that is the human hand is highly likely to be positioned, from the detected moving area.

As described above, in one embodiment, when performing the detection, when the movement level of one block in the present depth image frame is greater than or equal to a second predetermined threshold, it is possible to confirm that the block belongs to part of the human hand. This second predetermined threshold for confirming a human hand is greater than the first predetermined threshold for detecting a moving block.

The second predetermined threshold may be set as a fixed value from past experiences, or set to a dynamic value based on the movement level of each moving block. For example, the movement levels of the respective moving blocks are arranged in a descending order, and the movement level of the first 40% is set as the second predetermined threshold (the movement level of the human hand is relatively larger than that of other parts of the body). In this case, the area including the moving blocks having the movement level of the first 40% of the movement levels arranged in the descending order, can be confirmed as the human hand. In this case, the second predetermined threshold also changes based on the distribution of the movement levels of the respective moving blocks.

In an embodiment, by the following formula, it is possible to quantify the difference between numbers of pixels positioned in respective different depth areas in each of the blocks in the present depth image frame, and numbers of pixels positioned in respective different depth areas in each of the corresponding blocks in each past depth image frame, and to acquire the movement level of each block.

$$C_j = \sum_{i=1}^{K} \left| (N * S_{ji}) * \log \frac{N * S_{ji}}{T_{ji}} \right|, j = 1 \ldots M$$

In the above formula, $C_j$ expresses the movement level of the jth block (j=1, 2, . . . , M), M expresses the number of blocks into which the frame is divided, N expresses the number of past depth image frames, K expresses the number of depth areas, $S_{ji}$ expresses the number of pixels positioned in the ith depth area in the jth block in the present depth image frame (i=1, 2, . . . , K), and $T_{ji}$ expresses a value obtained by adding the numbers of pixels positioned in the ith depth area in the jth block in the respective past depth image frames. As a matter of course, it is obvious that the formula for quantifying the movement levels of the respective blocks is not so limited; any formula for applying the difference between numbers of pixels positioned in respective different depth areas in each of the blocks in the present depth image frame, and numbers of pixels positioned in respective different depth areas in each of the corresponding blocks in each past depth image frame, may be used in the present application.

The above are embodiments for detecting the moving object that is the human hand, according to the movement level of each block in the present depth image frame. Furthermore, when it is observed that after the human hand moves for a while, the hand stops and does not move for a certain time, or the movement level is significantly small, for example, the game console uses the staying time of the human hand to trigger an event of clicking one button. In this case, by the conventional movement detection method (for example, a method based on the frame difference), it is not possible to acquire the position of the human hand, which is in a still state or which has a significantly low movement level. Therefore, inventors of the present invention have further considered the distribution of the moving blocks in a previous depth image frame (if any), for example, the position and/or the movement level, so that it is possible to further accurately detect a human hand by considering the previous movement of the human hand (the human hand that is presently likely to be still, or the human hand whose movement level is significantly low).

Therefore, in one embodiment, the part of the present depth image frame that belongs to the human hand is determined by the position and movement level of the moving blocks in the present depth image frame detected presently, and the position and movement level of the moving blocks in at least one previous depth image frame detected previously.

In one embodiment, the step of determining the part of the present depth image frame that belongs to the human hand by the position and movement level of the moving blocks in the present depth image frame detected presently, and the position and movement level of the moving blocks in at least one previous depth image frame detected previously, includes mapping a first moving area in the present depth image frame, based on the position of the first moving area including moving blocks in the previous depth image frame detected previously, and superposing the first moving area entirely or partially on a second moving area including moving blocks in the present depth image frame; superposing the movement level of the pixel points in the first moving area after being mapped and the movement level of the pixel points in the second moving area, and acquiring an accumulated movement level diagram based on the previous movement; and determining the area satisfying a predetermined condition as the human hand, based on the accumulated movement level diagram based on the previous movement. The superposing of the movement levels may be performed by simple addition.

In the embodiment, for example, it may be observed that other parts of the human body may move, such as the arm, during the interaction between a human being and a computer. According to experiments, it has been found that movements of the human hand have a special configuration, which are different from movements of other parts of the body. For example, at the same time as the movement of the body, the human hand, the arm also moves. These movements are similar to a single straight line rotating around a fixed point. That is to say, a straight line formed by the human hand and the arm rotates around the elbow or the shoulder, and the movement of the human hand is more rapid than the movement of the arm, the elbow, or the shoulder. Therefore, in the embodiment, a first moving area including moving blocks in (one or more) the previous depth image frame detected previously, is moved, so as to partly or entirely superpose a second moving area including moving blocks detected in the present depth image frame (so as to be overlapping as much as possible; for example, so that the area of the part where the first moving area and the second moving area are overlapping is maximum). Next, the movement level of the pixel points in the first moving area after being projected (mapped) and the movement level of the pixel points in the second moving area are superposed, and an accumulated movement level diagram based on a previous movement is acquired. That is to say, it is possible to acquire an accumulated movement level diagram which expresses that the human hand has a high movement level, as follows. Specifically, when the human hand in the present depth image frame is in a still state, i.e., when it is detected that the block of the part of the human hand in the present depth image frame is still and not moving, the human hand detected in the previous depth image frame (for example, the previous human hand is moving) is superposed on the present human hand, and the movement level of the moving block, which is obtained by this superposing process, expresses that the human hand has a high movement level in the accumulated movement level diagram. Therefore, based on the accumulated movement level diagram, an area satisfying a predetermined condition by various configurations of threshold processing is found, and the found area is determined to be the human hand. As a matter of course, when the present depth image frame is the first frame, there may be a possibility that there is no moving block detected in a previous depth image frame; in this case, this accumulation is not performed, and a human hand is detected simply by using the second predetermined threshold described above.

It is to be noted here that "the moving blocks in the previous depth image frame detected previously" are of a different concept from that of the past depth image frame that is used when detecting the moving blocks in the present depth image frame. The past depth image frame that is used when detecting the moving blocks in the present depth image frame, is at least one past depth image frame that exists before the present depth image frame, and there is a possibility that moving blocks are not detected from the at least one past depth image frame. "The moving blocks in the previous depth image frame detected previously" means that a moving block is detected from one previous depth image frame which is closest to and before the present depth image frame and which is detected previously. Therefore, the moving blocks can be recognized in a previous depth image frame that has been detected previously.

As described above, at the same time as the human hand moves, the arm moves, and these movements are similar to a single straight line rotating around a single fixed point, i.e., it has been observed that a straight line constituted by the human hand and the arm rotates around the elbow or the shoulder. Therefore, in one embodiment, the step of mapping the first moving area on the present depth image frame based on the position of the first moving area including the moving blocks in the previous depth image frame that has been detected previously, so that the first moving area entirely or partially overlaps the second moving area including the moving blocks in the present depth image frame, further includes the following steps. That is to say, the above step includes calculating the first main direction, the first center axis line, and the first weighted center of the first moving area based on the position of the moving blocks in the previous depth image frame detected previously, calculating the second main direction, the second center axis line, and the second weighted center of the second moving area based on the positions of the moving blocks in the present depth image frame detected, and moving the first moving area such that the first weighted center and the second weighted center entirely or partially overlap each other, the first center axis line and the second center axis line entirely or partially overlap each other, and the first main direction and the second main direction entirely or partially overlap each other.

Here, it is possible to use the known principal component analysis (PCA) for calculating the main direction of an area (see Wikipedia, http://zh.wikipedia.org/wiki/%E4%B8%BB%E6%88%90%E5%88%86%E5%88%86%E6%9E%90). By the PCA algorithm, a dimension having a relatively large distribution can be found in the dimensions, and at the same time, a relatively average dimension can be disregarded.

In one example, an oval that is tilted by 75 degrees in a planar area has a long axis that is significantly longer than the short axis, the distribution of points of the oval is significantly sparse on the short axis compared to the long axis, and the short axis is significantly shorter than the long axis. In this case, the oval nearly becomes one straight line, and the dimension of the short axis is lost. With respect to a set of numbers (for example, numbers in a two-dimensional space), for example, in X=(X1, X2, X3, . . . , Xn), each Xi is constituted by one two-dimensional vector, and a diagram in this coordinate system is as illustrated in FIG. 5E. The main task of PCA is to find one direction, and to maximize the distribution of projection along this direction for the numbers in this set (after the projection along this direction, the distance between the point on the leftmost side and the point on the rightmost side is maximum). In FIG. 5F, when the distribution of projection along a line closest to the area of dots is maximum, this line is the main direction. Specific processes of PCA are not described, and those skilled in the art know the specific algorithm of the PCA method. The center axis line can be expressed by a line in which the main direction is located, and the center axis line may be obtained by another known method. Furthermore, to obtain the weighted center of an area, various known algorithms may be used, which are not described herein.

The arm and human hand usually rotate around the elbow or the shoulder, and therefore by a digital configuration, it is possible to map a first moving area detected in a previous depth image frame on a second moving area detected in the present depth image frame. In one example, as described above, it is possible to move the first moving area such that the first weighted center and the second weighted center entirely or partially overlap each other, the first center axis line and the second center axis line entirely or partially overlap each other, and the first main direction and the second main direction entirely or partially overlap each other. Here, the first moving area and the second moving area may have different shapes, or there may be a detection error of the moving block. Therefore, regardless of how the first moving area is moved, it may not be possible to make the first weighted center and the second weighted center completely overlap each other, make the first center axis line and the second center axis line completely overlap each other, or make the first main direction and the second main direction completely overlap each other. Accordingly, usually, these are made to partially overlap each other as much as possible, for example, to maximize the overlapping area. In one embodiment, for example, it is possible to move the first moving area, to first make the first weighted center and the second weighted center completely overlap each other, make the first center axis line and the second center axis line completely overlap each other, and make the first main direction and the second main direction partially overlap each other; or to first make the first weighted center and the second weighted center completely overlap each other, make the first main direction and the second main direction completely overlap each other, and make the first center axis line and the second center axis line partially overlap each other. For example, as the overlapping standards, the weighted center, the main direction, and the center axis are examples; in other embodiments, the edges of the moving areas may also be made to overlap each other as much as possible.

According to observations, the human hand and the arm continued from the human hand, are usually a long thin shape, and therefore, before detecting the moving area of the human hand, the a moving area including all of the moving blocks is filtered in advance, so that the moving area that is most similar to the human hand and/or arm can be found. For example, the first moving area and the second moving area may be areas that satisfy the following conditions. That is, the shape of the moving area constituted by moving blocks is most enlongated, the moving area constituted by moving blocks has the highest similarity with the shape of the arm, the moving area constituted by moving blocks has an oval or a rectangle circumscribed, and the ratio of the long axis and the short axis or the aspect ratio has the highest similarity with the arm. To have an oval or a rectangle circumscribed to the moving area is a known geometric arithmetic operation configuration, and specific steps thereof are not described herein.

In one embodiment, the step of determining an area satisfying a predetermined condition as the human hand based on the accumulated movement level diagram based on the previous movement, may include one or more of the following processes. Specifically, the above step may include a process of determining areas having a movement level greater than a third predetermined threshold as an area of the human hand. The third predetermined threshold is obtained by arranging the movement levels in a descending order based on the movement levels after the superposing in the accumulated movement level diagram based on the previous movement, and setting a movement level value of a predetermined rank as a the third threshold value. The above step may also include a process of using the position of the area of the human hand previously detected (if any) with respect to the first moving area, to estimate the position of the area of the presently detected human hand with respect to the second moving area, and determining the area of the human hand based on the position of the area of the human hand presently detected with respect to the second moving area. The above step may also include a process of finding an area, which has a similarity that is greater than a predetermined value with respect to information including at least one of the color, the grayscale, and the depth of the human hand.

As a matter of course, there may be another configuration of determining the area of the human hand according to features of the human hand, in the accumulated movement level diagram of a previous movement. For example, an area which has a relatively high movement level, and which has a thicker shape than other parts, may be determined as the human hand (because the human hand is usually thicker than the arm). The examples in the present application are merely examples, and do not limit the present invention.

As described above, according to embodiments of the present invention, according to the difference between numbers of pixels positioned in respective different depth areas in each of the blocks in the present depth image frame, and numbers of pixels positioned in respective different depth areas in each of the corresponding blocks in each past depth image frame, it is possible to find an area of a moving object by a detected moving block including the human hand. Furthermore, according to the detection status of a previous moving block and/or features such as the shape, the color, the grayscale, and the depth of the human hand, it is possible to detect the area of the human hand more accurately.

In order to realize the method of detecting the moving body that is the human hand according to embodiments of the present invention, in the following, other embodiments of the present invention are schematically described with reference to drawings.

Figure 3A:
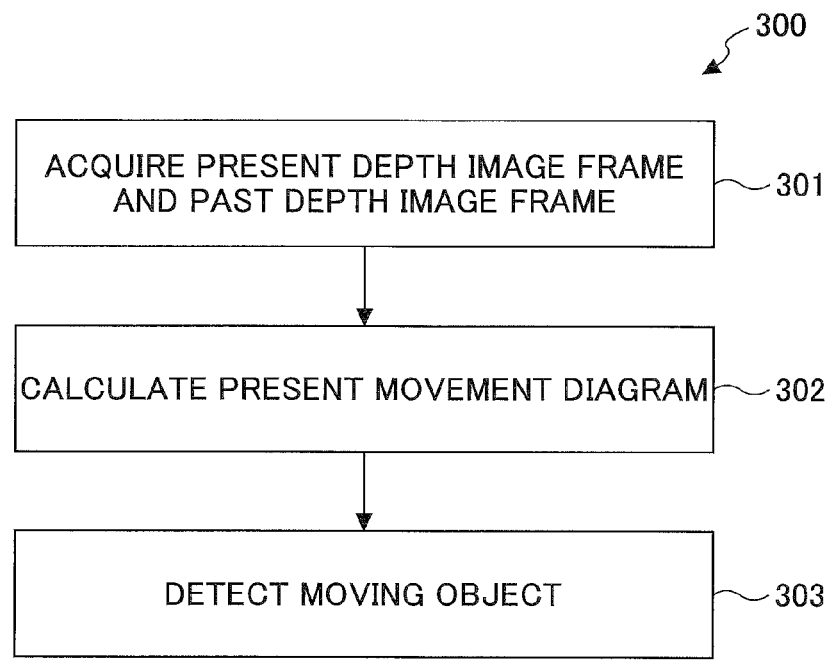
FIG. 3A is a flowchart of another example of a method of detecting a moving object according to another embodiment of the present invention.

FIG. 3A is a flowchart of another example of a method of detecting a moving object according to another embodiment of the present invention.

The moving body detection method 300 according to another embodiment of the present invention illustrated in FIG. 3A, includes acquiring the present depth image frame and one or more past depth image frames, and dividing each of the present depth image frame and one or more past depth image frames into an M number of blocks (M being a positive integer) (step S301). A present movement diagram is calculated based on the present depth image frame and one or more past depth image frames. The present movement diagram is calculated so that the difference and the degree of difference between numbers of pixels positioned in respective different depth areas in each of the blocks in the present depth image frame, and numbers of pixels positioned in respective different depth areas in each of the corresponding blocks in each past depth image frame, can be more intuitively reflected by an image (step S302). A moving block is detected based on the calculated present movement diagram, and the detected moving object is constituted (step S303). The present movement diagram is calculated to more intuitively reflect the difference and the degree of difference, so that subsequent detection processes can be performed more simply, intuitively, and clearly.

Figure 3B:
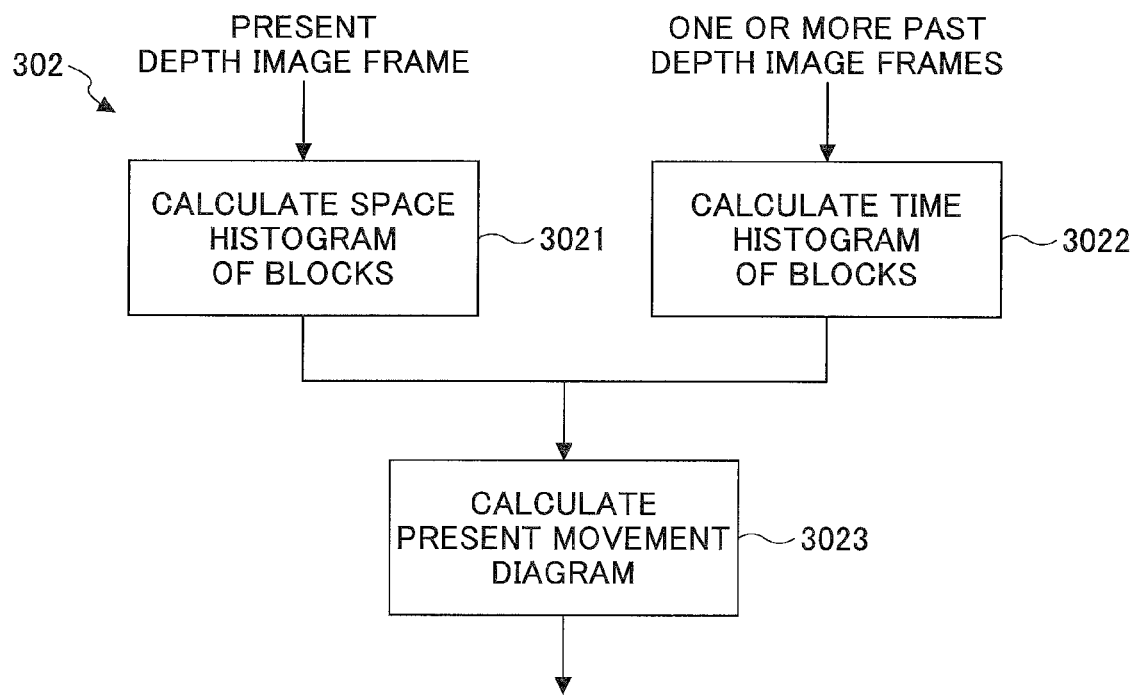
FIG. 3B is a flowchart to specifically describe an example of step S302 of calculating the present movement diagram in the moving object detection method of FIG. 3A.
Figure 3C:
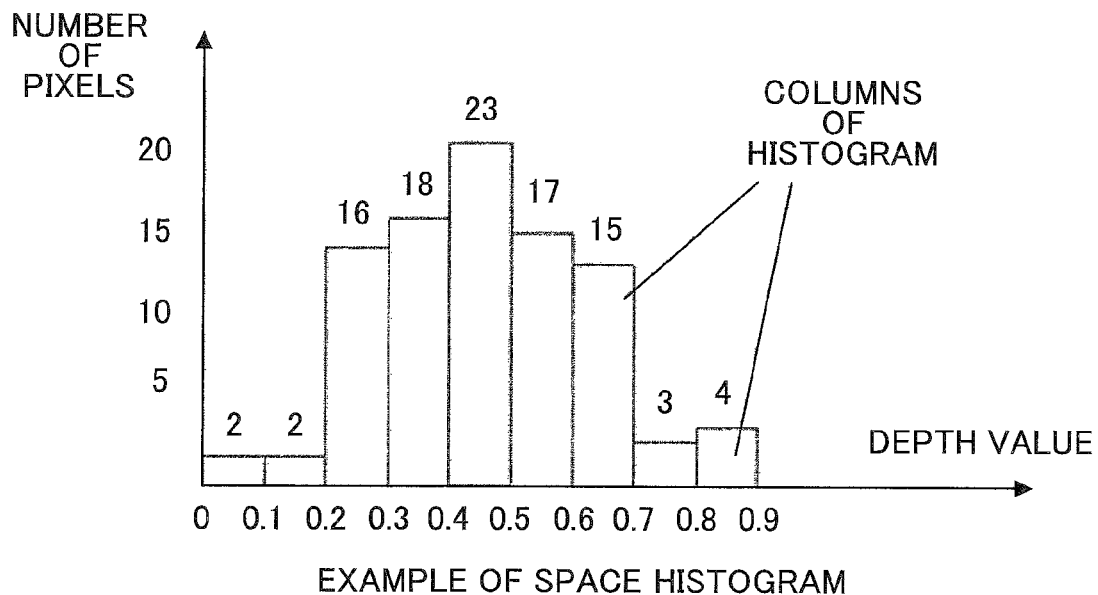
FIG. 3C schematically illustrates an example of a space histogram of a certain block.
Figure 3D:
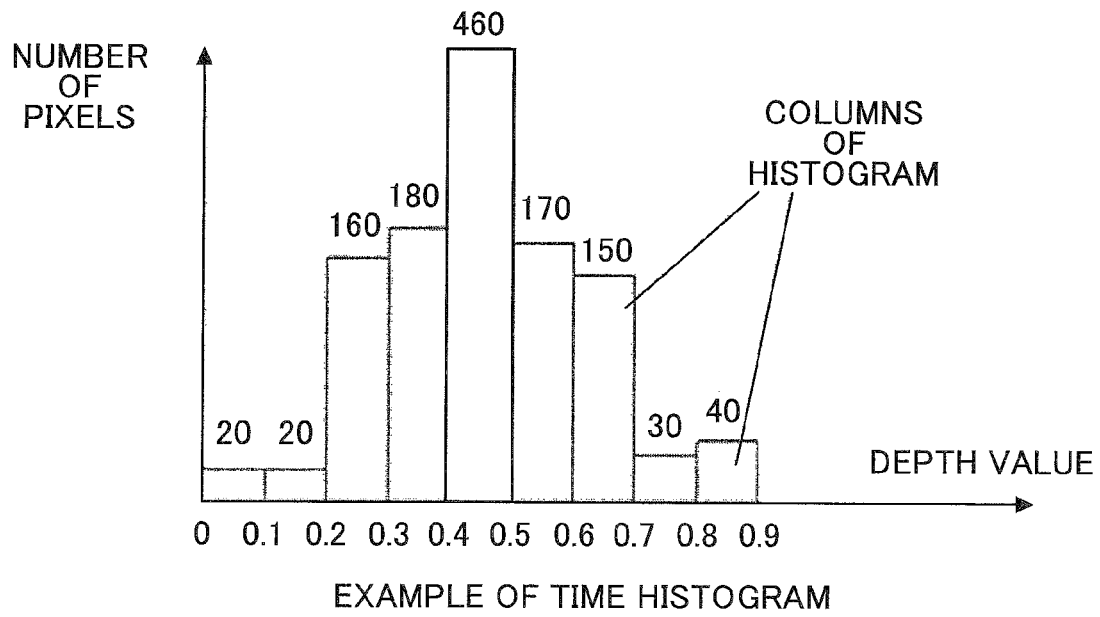
FIG. 3D schematically illustrates an example of a corresponding time histogram of a certain block.

FIG. 3B is a flowchart to specifically describe an example of step S302 of calculating the present movement diagram in the moving object detection method.

As illustrated in FIG. 3B, the step S302 of calculating the present movement diagram includes using the present depth image frame to calculate a space histogram S of the divided blocks (step S3021), using the one or more past depth image frames to calculate a time histogram T of the divided blocks (step S3022), and using the space histogram S and the time histogram T to calculate the present movement diagram (step S3023). The space histogram S is merely for reflecting the numbers of pixels positioned in respective different depth areas in the respective blocks of the present depth image frame (spatial) more intuitively with an image. The time histogram T is merely for reflecting the numbers of pixels positioned in respective different depth areas in the corresponding blocks of each past depth image frame (of different times) more intuitively with an image.

FIG. 3C schematically illustrates an example of a space histogram S of the jth block, and FIG. 3D schematically illustrates an example of a corresponding time histogram T of the jth block. With reference to FIG. 3C, in the space histogram S, there may be a total of nine depth areas of 0-0.1, 0.1-0.2, 0.2-0.3 . . . 0.8-0.9 (the depth areas may be divided in units of meters, etc., or the depth areas may be standardized, and therefore the scales of the depth areas are unrelated to a specific unit M, and only express ratios). For example, there are two pixels positioned in the depth area 0-0.1, and among these two pixels, it is assumed that one pixel has a depth of 0.02 (in meters or other units), and one pixel has a depth of 0.0825 (in meters or other units). There are two pixels positioned in the depth area 0.1-0.2, and among these two pixels, it is assumed that one pixel has a depth of 0.15 (in meters or other units), and one pixel has a depth of 0.16 (in meters or other units). There are 23 pixels positioned in the depth area 0.4-0.5 . . . . There are four pixels positioned in the depth area 0.8-0.9, and among these four pixels, it is assumed that one pixel has a depth of 0.85 (in meters or other units), one pixel has a depth of 0.83 (in meters or other units), one pixel has a depth of 0.84 (in meters or other units), and one pixel has a depth of 0.89 (in meters or other units). With reference to FIG. 3D, in the time histogram T, a column in each depth area (that is to say, the number of pixels positioned in the depth area) expresses the total number of pixels positioned in the depth area in the past depth image frames. For example, assuming that there are ten past depth image frames, in the ten past depth image frames, for example, it is acquired that there are 20 pixels positioned in the depth area 0-0.1, there are 20 pixels positioned in the depth area 0.1-0.2, there are 460 pixels positioned in the depth area 0.4-0.5, . . . , and there are 540 pixels positioned in the depth area 0.8-0.9. As a matter of course, the column in the example of the time histogram T expresses the total number of pixels positioned in the depth area in the past depth image frames. However, this sum may be divided by ten to obtain an average, and the obtained value may be set as the value of the column. For example, 2, 2 . . . 4 6 . . . 4 are obtained, and a more intuitive comparison is made with the space histogram S, to find the difference and/or the degree of difference.

Furthermore, when obtaining the time histogram, it is possible to consider the number of pixels positioned in the depth area in the present depth image frame. That is to say, the column of the time histogram T may be the sum of the pixel numbers positioned in the depth area in the present depth image frame and the past depth image frames (that is to say, a total of 11 frames); however, the sum of pixel numbers may be divided by 11 to obtain an average, and the obtained value may be set as the value of the column. However, the present application is not limited by the example of obtaining the time histogram by ten past depth image frames.

Furthermore, for example, it is possible to use 10 past depth image frames to obtain an average of pixel numbers positioned in a depth area, and resolve errors in several pixel depths in several past depth image frames, and obtain more stable determination results. As described above, in step S3023, the space histogram S and the time histogram T are used to calculate a present movement diagram C. In one embodiment, by the following formula, the space histogram S and the time histogram T are used to calculate a present movement diagram C.

$$C_j = \sum_{i=1}^{K} \left| (N*S_{ji}) * \log \frac{N*S_{ji}}{T_{ji}} \right|, j = 1 \ldots M$$

In the above formula, $C_j$ expresses the movement level of the jth block (j=1, 2, . . . , M), M expresses the number of blocks into which the frame is divided, N expresses the number of past depth image frames, K expresses the number of depth areas, $S_{ji}$ expresses the number of pixels positioned in the ith depth area in the jth block in the present depth image frame (i=1, 2, . . . , K), and $T_{ji}$ expresses a value obtained by adding the numbers of pixels positioned in the ith depth area in the jth block in the respective past depth image frames. In the above formula, $$\frac{N*S_{ji}}{T_{ji}}$$

may be expressed as $$\frac{S_{ji}}{T_{ji}/N}.$$

In the above formula, when $N*S_{ji}=T_{ji}$ is satisfied (or both are relatively close) (that is to say, the result obtained by multiplying N by the number of pixels $S_j$ positioned in the ith depth area in the jth block in the present depth image frame, is the sum of the numbers of pixels $T_{ji}$ positioned in the ith depth area in the jth block in the respective past depth image frames; there is not much difference between the number of pixels positioned in the ith depth area in the jth block and the past image frame), $$\log \frac{N*S_{ji}}{T_{ji}}$$

may be zero or a significantly small value. Therefore, a value of a smaller movement level $C_j$ can be acquired. $N*S_{ji}$ prevents a situation where the value of $$\log \frac{N*S_{ji}}{T_{ji}}$$

is so small that it is difficult to detect the value. The above formula is one example, and the present embodiment is not so limited. It is obvious that in order to acquire the quantified difference, another formula may be created to reflect the difference. That is to say, by calculating the acquired present movement diagram C, it is possible to obtain M blocks, that is, it is possible to obtain a shape corresponding to the present depth image frame, and an M value corresponding to the M blocks into which the frame is divided, and the respective values express the movement level of the blocks obtained by quantifying the degree of difference of the respective blocks. As described above, by the present movement diagram C according to the present embodiment, it is possible to see more intuitively, which block at which position has what level of movement.

As described above, by the examples of the time histogram and the space histogram of the jth block illustrated in FIGS. 3C and 3D, it is possible to obtain $C_j=69$ by using the above formula.

Next, in the present movement diagram C, a block having a movement level of greater than or equal to a first predetermined threshold is detected, and the detected block is set as the moving block. Accordingly, moving areas constituted by moving blocks are acquired, and are set as moving objects. The selection of the first predetermined threshold is determined to be a movement level of each block obtained by calculation, according to specific circumstances such as the size of the block. For example, the first predetermined threshold may be set as an average value or half of the average value of movement levels, which is obtained by averaging the movement levels of all blocks. Therefore, the first predetermined threshold may be fixed, or may be changed based on specific circumstances obtained by calculating the movement levels of all blocks. As the first predetermined threshold becomes smaller, the detection of the moving blocks becomes more sensitive, such that even a slight movement is detected as a moving block. Conversely, as the first predetermined threshold becomes larger, the detection of the moving blocks becomes less sensitive, such that only a large movement is detected as a moving block. Thus, the sensitivity in detecting moving blocks can be adjusted by flexibly adjusting the first predetermined threshold.

An embodiment of detecting a typical moving block is described above. Generally, after detecting a moving block, a moving area constituted by a moving block can be determined as a moving object. Furthermore, a specific embodiment of a method of detecting a human hand is described below, which is an example of a moving object having special movement features and shape features.

Figure 4A:
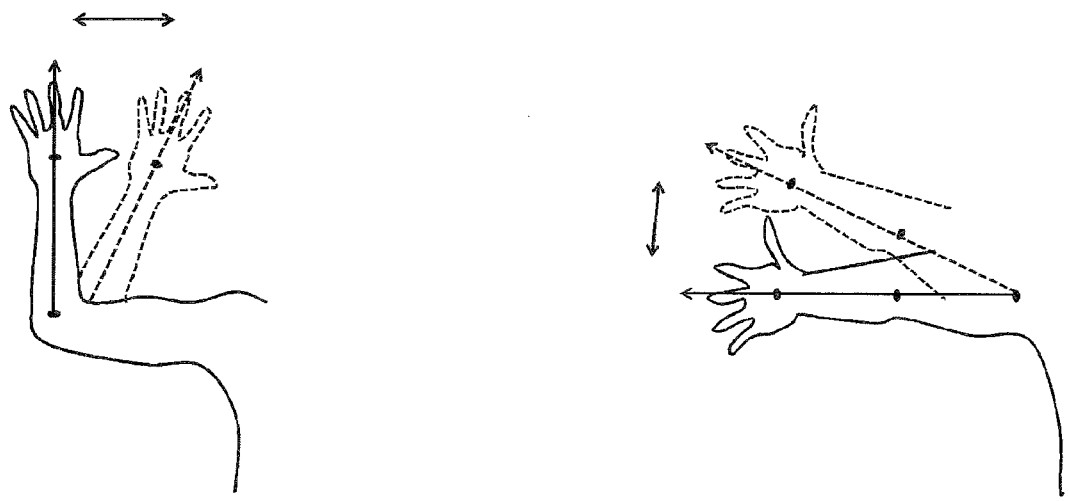
FIG. 4A is a schematic diagram of the movement principle of a human hand.

FIG. 4A is a schematic diagram of the movement principle of a human hand.

As illustrated in FIG. 4A, it is known that the shape of the human hand is relatively narrow and long compared to other parts of the body. When the human hand moves, other parts of the body are likely to move; for example, the elbow, the lower arm, and the upper arm move. By observation, it is known that the movement of the human hand has a special configuration, which is different from movements of other parts of the body. At the same time as the human hand moves, the lower arm, elbow, and upper arm move, and these movements are similar to a single straight line rotating around a fixed end. That is to say, a straight line constituted by the human hand, the arm, and the elbow or the upper arm rotates around the elbow or the shoulder. Furthermore, the movement of the human hand is more rapid than the movement of the lower arm, the upper arm, the elbow, or the shoulder.

Figure 4B:
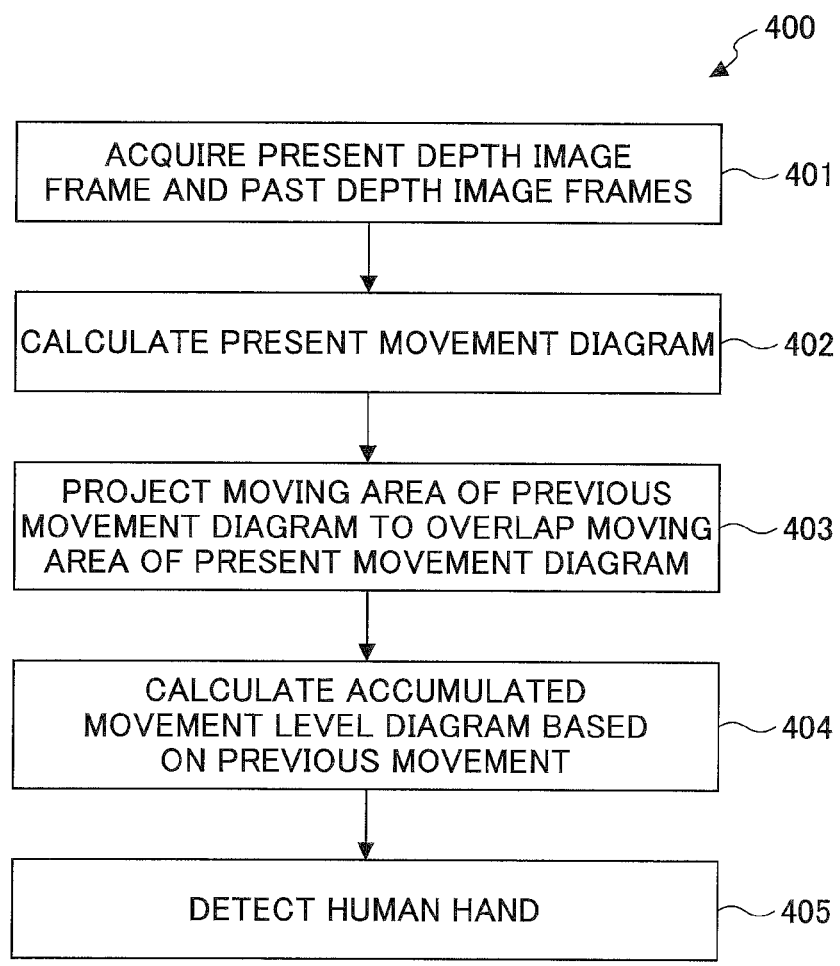
FIG. 4B is a flowchart of another example of a method of detecting the moving object that is the human hand according to another embodiment of the present invention, by using the movement principle of the human hand illustrated in FIG. 4A.

FIG. 4B is a flowchart of another example of a method of detecting the moving object that is the human hand according to another embodiment of the present invention, by using the movement principle of the human hand illustrated in FIG. 4A.

In one embodiment, when there is a position and movement level of a moving block in the previous depth image frame that has been detected previously (for example, there is a previous movement diagram detected previously, and the calculation configuration may be the same as the calculation configuration of the present movement diagram), based on the movement principle of the human hand, the part belonging to the human hand in the present depth image frame is determined, according to the position and movement level of moving blocks in the present depth image frame detected presently, and a position and movement level of a moving block in at least one previous depth image frame detected previously.

For example, as illustrated in FIG. 4B, the method 400 of detecting a moving body of a human hand includes acquiring the present depth image frame and one or more past depth image frames (step S401), calculating a frame present movement diagram based on the present depth image frame and one or more past depth image frames (as to an example of a calculation configuration, reference may be made to FIG. 3B and relevant descriptions) (step S402), and projecting a first moving area including moving blocks in a previous movement diagram (if any) on a second moving area including moving blocks in a present movement diagram to entirely or partially overlap the second moving area (step S403). The movement level of the pixel points in the first moving area after being projected and the movement level of the pixel points in the second moving area are superposed, and an accumulated movement level diagram based on the previous movements is acquired (step S404). Based on the accumulated movement level diagram based on the previous movement, an area satisfying a predetermined condition is detected as a human hand (step S405). The superposing of the movement levels may be performed by simple addition.

There are various projection configurations of superposing the first moving area in the previous movement diagram and the second moving area in the present movement diagram. The following is one example of a simple configuration; the two moving areas may be superposed by another known projection configuration, for example, the first moving area and the second moving area are analyzed, and the projection direction and the projection amplitude of the first movement area to the second movement area are calculated. The projection direction is calculated from the main direction of the first moving area, i.e., a main direction of the moving area in one previous frame, and a main direction of a second moving area in the present movement diagram. The projection amplitude may be the orthogonal distance from the points in the first moving area to the second moving area (for example, this may be estimated according to the perpendicular direction from the points on along the main direction of the first moving area to the main direction of the second moving area). Next, based on the projection direction and amplitude, the second moving area is projected on the first moving area. As a matter of course, the first moving area and the second moving area may be overlapped as much as possible using other configurations, which are not described herein.

Figure 5A:
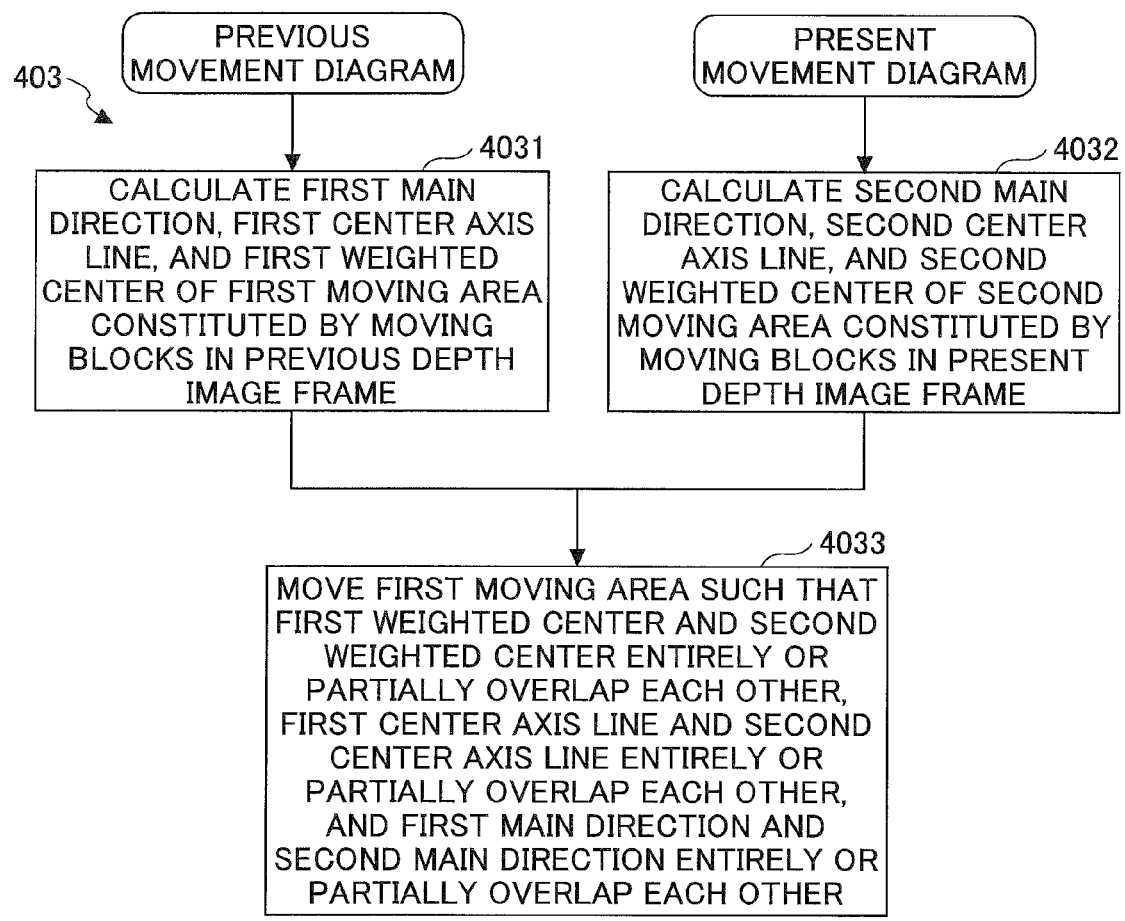
FIG. 5A is a detailed flowchart of an example of step S403, in which the previous movement diagram is projected and superposed on the present movement diagram in the method of detecting a moving object that is the human hand of FIG. 4B.

FIG. 5A is a detailed flowchart of an example of step S403, in which the previous movement diagram is projected and superposed on the present movement diagram in the method of detecting a moving object that is the human hand of FIG. 4B.

In FIG. 5A, step S403 of projecting and superposing the previous movement diagram on the present movement diagram, includes calculating a first main direction, a first center axis line, and a first weighted center of the first moving area constituted by moving blocks in the previous depth image frame according to the previous depth image frame (step S4031), calculating a second main direction, a second center axis line, and a second weighted center of the second moving area constituted by moving blocks in the present depth image frame according to the present depth image frame (step S4032), and moving the first moving area such that the first weighted center and the second weighted center entirely or partially overlap each other, the first center axis line and the second center axis line entirely or partially overlap each other, and the first main direction and the second main direction entirely or partially overlap each other (step S4033).

Here, the first moving area and the second moving area may have different shapes, or there may be a detection error in detecting the moving block. Therefore, regardless of how the first moving area is moved, it may not be possible to make the first weighted center and the second weighted center completely overlap each other, make the first center axis line and the second center axis line completely overlap each other, or make the first main direction and the second main direction completely overlap each other. Accordingly, usually, these are made to partially overlap each other as much as possible, so that the overlapping area is maximum. In one embodiment, for example, it is possible to move the first moving area, to first make the first weighted center and the second weighted center completely overlap each other, make the first center axis line and the second center axis line completely overlap each other, and make the first main direction and the second main direction partially overlap each other; or to first make the first weighted center and the second weighted center completely overlap each other, make the first main direction and the second main direction completely overlap each other, and make the first center axis line and the second center axis line partially overlap each other. For example, as the overlapping standards, the weighted center, the main direction, and the center axis are examples; in other embodiments, the edges of the moving areas may also be made to overlap each other as much as possible.

Figure 5B:
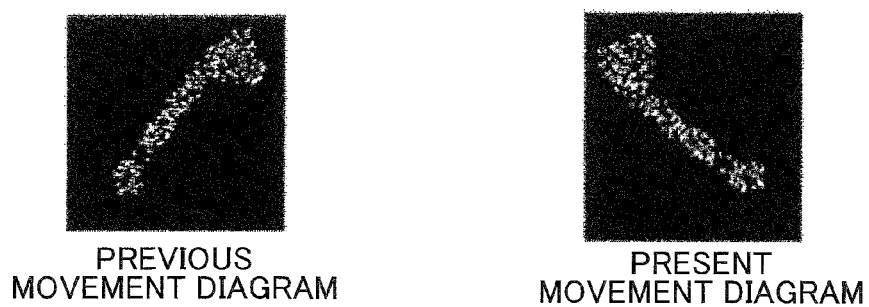
FIG. 5B schematically illustrates a first moving area constituted by moving blocks of the previous movement diagram, and a second moving area constituted by moving blocks of the present movement diagram.

FIG. 5B schematically illustrates a first moving area constituted by moving blocks of the previous movement diagram, and a second moving area constituted by moving blocks of the present movement diagram. In FIG. 5B, for example, the white small blocks express blocks that have been detected as moving, and the black small blocks express blocks that have been detected as not moving. The values of the small blocks are the movement level of the corresponding blocks, as described above.

Figure 5C:
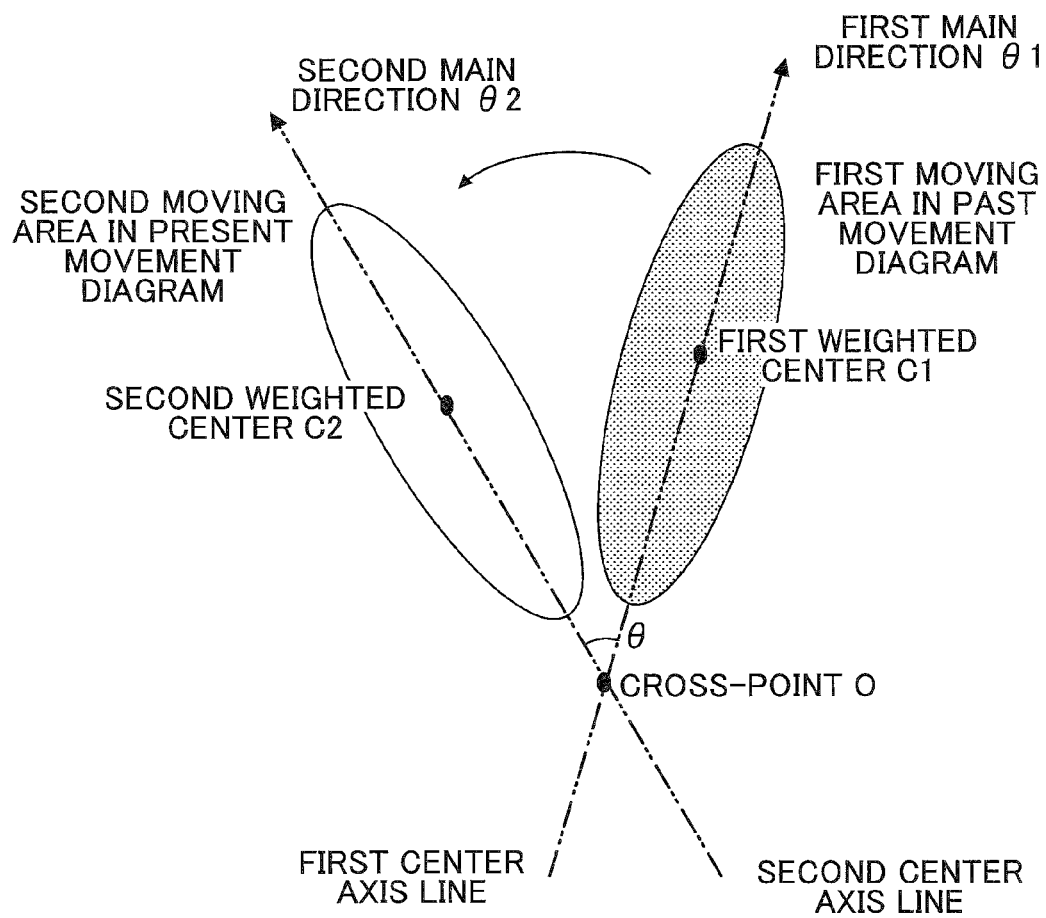
FIG. 5C schematically illustrates an example of the first moving area and the second moving area in the method of detecting a moving object that is a human hand, and how the previous movement diagram is moved to overlap the present movement diagram.

FIG. 5C schematically illustrates an example of the first moving area and the second moving area in the method of detecting a moving object that is a human hand, and how the previous movement diagram is moved to overlap the present movement diagram. In FIG. 5C, it is known that the first main direction in the first moving area in the previous movement diagram is $\theta 1$, and the second main direction in the second moving area in the present movement diagram is $\theta 2$. The first weighted center of the first moving area in the previous movement diagram is C1, and the second weighted center of the second moving area in the present movement diagram is C2. In this example, the first center axis line in the first moving area in the previous movement diagram is along a single straight line together with the first main direction, and the second center axis line in the second moving area in the present movement diagram is along a single straight line together with the second main direction. As a matter of course, in other embodiments of different calculation configurations, the center axis line and the main direction do not need to be positioned on a single straight line.

Here, it is possible to use the known principal component analysis (PCA) for calculating the main direction of an area (see Wikipedia, http://zh.wikipedia.org/wiki/%E4%B8%BB%E6%88%90%E5%88%86%E5%88%86%E6%9E%90). By the PCA algorithm, a dimension having a relatively large distribution can be found in the dimensions, and at the same time, a relatively average dimension can be disregarded. For example, with respect to a set of numbers (for example, a number in a two-dimensional space), for example, in X=(X1, X2, X3, . . . , Xn), each Xi is constituted by one two-dimensional vector, and a diagram in this coordinate system is as illustrated in FIG. 5E. The main task of PCA is to find one direction, and to maximize the distribution of projection along this direction for the numbers in this set (after the projection along this direction, the distance between the point on the leftmost side and the point on the rightmost side is maximum). In FIG. 5F, when the distribution of projection along a line closest to the area of dots is maximum, this line is the main direction. Specific processes of PCA are not described, and those skilled in the art know the specific algorithm of the PCA method. The purpose of obtaining the main direction of the area is to find a direction of the human arm with respect to the arm. Usually, the shape of the human hand is thicker than the arm. Therefore, when a moving area including the moving hand and the arm (for example, as illustrated in FIG. 5B) is detected, the shape of the human hand is relatively thick, and therefore the obtained main direction may be a direction from the arm to the hand. In this manner, in many moving areas having different directions in the previous movement diagram and the present movement diagram, it is possible to easily determine the part of the position of the human hand in such moving areas. Accordingly, in future cases, when the moving area in the previous movement diagram is projected and superposed on the moving area in the present movement diagram, it is possible to make the part of the human hand in the previous movement diagram overlap the part of the human hand in the present movement diagram as much as possible.

The center axis line can be expressed by a line in which the main direction is located, or the center axis line can be obtained by another known method. Furthermore, to obtain the weighted center, known algorithms may be used, which are not described herein.

As described above, in the status of FIG. 5C, in order to project or move the first moving area such that the first moving area and the second moving area overlap each other, the first moving area is first rotated on a cross-point O of the first center axis line and the second center axis line, from the first moving area toward the second moving area, by an included angle θ of a first main direction θ1 and a second main direction θ2. First, the first center axis line of the first moving area and the second center axis line of the second moving area are superposed, and next, the first moving area after the movement is moved along the first and second center axis lines, so that the first weighted center C1 and the second weighted center C2 are superposed.

As a matter of course, the configuration of using the main direction, the center axis line, and the weighted center to make the first moving area and the second moving area overlap each other as much as possible, is merely an example, and actually, other configurations of making the first moving area and the second moving area overlap each other as much as possible, for example by maximizing the overlapping area, are applicable to the present embodiment.

After the first moving area and the second moving area are made to overlap each other as much as possible, at the same point, the movement level of the first moving area at this point and the movement level of the second moving area at this point are superposed, and an accumulated movement level diagram based on the previous movement can be acquired. In this example, the factor of the movement level of one point (for example, one pixel in 10×10 pixels in a small block), is that after the first moving area is rotated and moved, the edges of a block having a size of 10×10 pixels in the first moving area may not be able to completely overlap the edges of a block in the second moving area. Thus, even if the accumulation of the movement levels is not calculated by using the block as the minimum unit, all pixels in the same block are made have the same movement level and the accumulation of the movement levels is obtained by using the pixel points as the minimum unit, and an accumulated movement level diagram based on the previous movement based on the pixels can be acquired. That is to say, when the human hand is in a still state in the present depth image frame, i.e., when the block of the part of the human hand in the present depth image frame is detected as still and not moving, the movement level of this block in the present movement diagram may be zero or a very low level. In this manner, it is possible to acquire an accumulated movement level diagram expressing that the human hand part has a high movement level, by a movement level obtained by superposing moving blocks of the human hand part detected in the previous depth image frame on the present depth image frame (for example, when the human hand was moving previously, the movement level of the block of the corresponding position in the previous movement diagram is not zero or not low). Therefore, by a rational accumulated movement level diagram, an area satisfying a predetermined condition is found by various configurations such as threshold processing, and the area is determined as the human hand. The superposing of the movement levels may be performed by simple addition.

In one embodiment, the step of determining an area satisfying a predetermined condition as the human hand based on the accumulated movement level diagram based on the previous movement, may include one or more of the following processes. Specifically, the above step may include a process of determining areas having a movement level greater than a third predetermined threshold as an area of the human hand, arranging the movement levels in a descending order based on the movement levels after the superposing in the accumulated movement level diagram based on the previous movement, and setting a movement level value of a predetermined rank (for example, 40%) as the third threshold value. The above step may also include a process of using the position of the area of the human hand previously detected (if any) with respect to the first moving area, to estimate the position of the area of the presently detected human hand with respect to the second moving area, and determining the area of the human hand based on the position of the area of the human hand presently detected with respect to the second moving area. The above step may also include a process of finding an area, which has a similarity that is greater than a predetermined value with respect to information including at least one of the color, the grayscale, and the depth of the human hand. The area satisfying the predetermined condition is an area that has similar features as those of the human hand, in terms of the movement level, and the position, the color, the grayscale, and the depth in the moving area. Thus, based on the movement level, the area of the human hand may be detected, in consideration of other features of the human hand and an area satisfying more predetermined conditions.

As a matter of course, as described above, according to observations, the human hand and the arm continued from the human hand, are usually a long thin shape, and therefore, before detecting the moving area of the human hand, the a moving area including all of the moving blocks is filtered in advance, so that the moving area that is most similar to the human hand and/or arm can be found. For example, the first moving area and the second moving area may be areas that satisfy the following conditions. That is, the shape of the moving area constituted by moving blocks is most enlongated, the moving area constituted by moving blocks has the highest similarity with the shape of the arm, the moving area constituted by moving blocks has an oval or a rectangle circumscribed, and the ratio of the long axis and the short axis or the aspect ratio has the highest similarity with the arm. To have an oval or a rectangle circumscribed to the moving area is a known geometric arithmetic operation configuration, and specific steps thereof are not described herein.

Figure 5D:
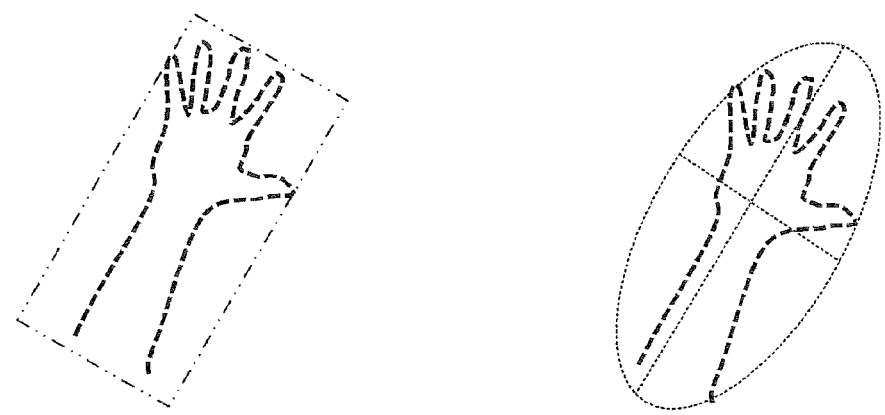
FIG. 5D schematically illustrates an example of a method of selecting a moving area that is most similar to the human hand, in the method of detecting a moving object that is the human hand.
Figure 5E:
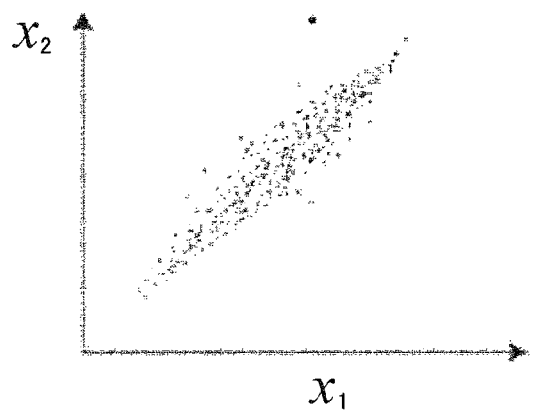
FIG. 5E schematically illustrates an area analyzed by using a principal component analysis (PCA) algorithm.
Figure 5F:
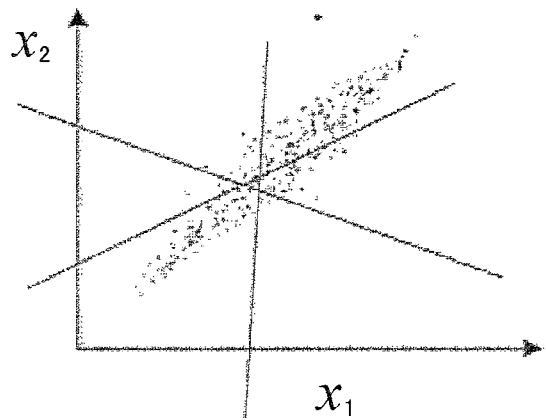
FIG. 5F schematically illustrates the calculation of the main direction of the area analyzed by using a principal component analysis (PCA) algorithm.

FIG. 5D schematically illustrates an example of a method of selecting a moving area that is most similar to the human hand, in the method of detecting a moving object that is the human hand. The left side of FIG. 5D schematically illustrates a method of circumscribing the moving area with a rectangle, and obtaining the difference between the ratio of the length and width of the moving area and the ratio of the length and width of a regular arm. When the difference is less than a threshold, the moving area is superposed with the arm, and the moving area can be determined as the first moving area or the second moving area. The right side of FIG. 5D schematically illustrates a method of circumscribing the moving area with an oval, and obtaining the difference between the ratio of the long axis and the short axis of the moving area and the ratio of the long axis and the short axis of a regular arm. When the difference is less than a threshold, the moving area is superposed with the arm, and the moving area can be determined as the first moving area or the second moving area. As a matter of course, the method of selecting a moving area that is most similar to the human hand is not limited to the methods of FIG. 5D; a moving area that is most similar to the human hand may be selected by another configuration. For example, the shape may be limited by using the maximum threshold and the minimum threshold of the length and width or the long axis and short axis of the circumscribing rectangular of the circumscribing oval of the moving area, and the area that the moving area and the actual arm are proximate, and the proximity level of the edge of the moving area and the edge of the arm may be used. Specific descriptions are omitted.

As described above, according to embodiments of the present invention, according to the difference between numbers of pixels positioned in respective different depth areas in each of the blocks in the present depth image frame, and numbers of pixels positioned in respective different depth areas in each of the corresponding blocks in each past depth image frame, it is possible to detect a moving block and find an area of a moving object including the human hand, and furthermore, it is possible to refer to the detection status of a previous moving block and/or refer to features of the human hand such as the shape, the color, the grayscale, and the depth, and detect an area of the human hand more accurately.

Figure 6:
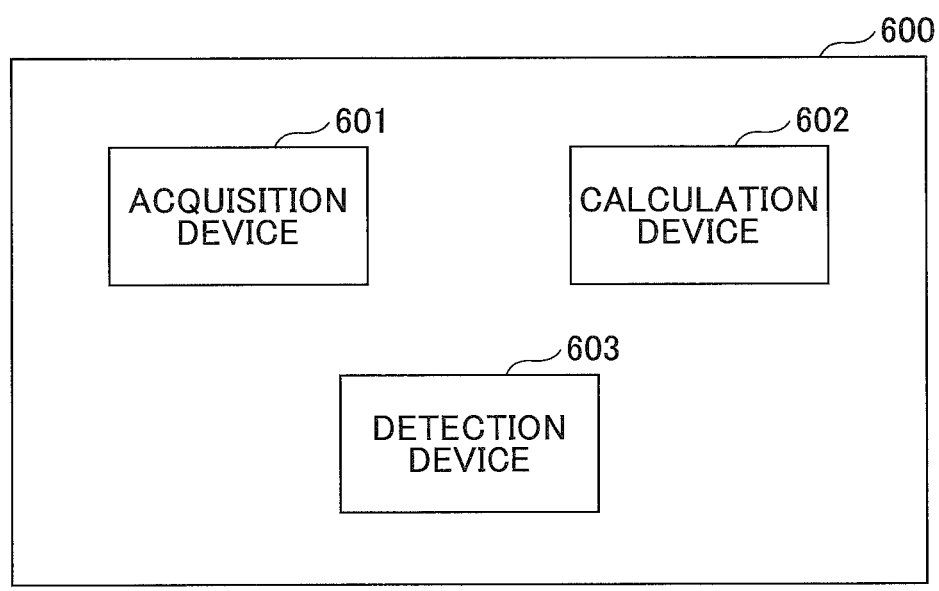
FIG. 6 is a block diagram of a moving object detection system according to another embodiment of the present invention.

FIG. 6 is a block diagram of a moving object detection system 600 according to another embodiment.

The moving object detection system 600 of FIG. 6 includes an acquisition device 601, a calculation device 602, and a detection device 603. The acquisition device 601 acquires at least two depth image frames having depth information obtained by continuously taking images of the moving object. The two depth image frames include the present depth image frame and at least one past depth image frame. Each of the two depth image frames is divided into a plurality of blocks. The calculation device 602 calculates the difference between numbers of pixels positioned in respective different depth areas in each of the blocks in the present depth image frame, and numbers of pixels positioned in respective different depth areas in each of the corresponding blocks in each past depth image frame. The detection device 603 detects a moving block in the present depth image frame based on the difference that has been calculated, and constitutes the detected moving object.

In an embodiment, each of the at least two depth image frames may be divided into a plurality of blocks by 10 pixels×10 pixels. As a matter of course, 10 pixels×10 pixels is one example; in other embodiments, the blocks may be other sizes, and the blocks do not necessarily need to be square blocks; the blocks may have various shapes such as a rectangle, a circle, and an oval.

Usually, when an object moves, the numbers of pixels positioned in respective different depth areas in each block usually change among adjacent frames or more frames (the present depth image frame and an N number of past depth image frames). When the object moves, the depth of a small part usually changes, and therefore the number of pixels positioned in the same depth area usually changes. Thus, the difference between numbers of pixels positioned in respective different depth areas in each of the blocks in the present depth image frame, and numbers of pixels positioned in respective different depth areas in each of the corresponding blocks in each past depth image frame, is observed, each moving block is detected in the present depth image frame, and a detected moving object is constituted by the detected moving blocks.

Therefore, the difference between numbers of pixels positioned in respective different depth areas in each of the blocks in the present depth image frame, and numbers of pixels positioned in respective different depth areas in each of the corresponding blocks in each past depth image frame, is observed, small moving blocks area detected, and these moving blocks are combined in several moving areas, so that it is possible to estimate the position where the moving object is located.

Usually, there is a difference between the numbers of pixels positioned in respective different depth areas in each of the blocks in the present depth image frame, and numbers of pixels positioned in respective different depth areas in each of the corresponding blocks in each past depth image frame, or the difference may be relatively large, and it is considered that the block moves in either case. This difference is quantified, and a threshold is obtained, and the detection and the determination standard area are unified while avoiding measurement or calculation errors. Therefore, in one embodiment, the detection device 603 may include a unit (not shown) for quantifying the degree of the difference of the above block, and calculating the movement level (extent of movement) of the block in the present depth image frame, and a unit (not shown) of detecting a block and setting the detected block as a moving block, when the movement level of one block is greater than or equal to a first predetermined threshold. Furthermore, during the interaction between a human and a computer of a game console, when it is found that the movement of the human hand is greater than the movement of other parts of the body (for example, the arm), the special properties of this movement of the human hand are considered, and it is possible to estimate the area where the moving object that is the human hand is highly likely to be positioned from the detected moving area.

As described above, in one embodiment, when performing the detection, when the movement level of one block in the present depth image frame is greater than or equal to a second predetermined threshold, it is possible to confirm that the block belongs to part of the human hand. This second predetermined threshold for confirming a human hand is greater than the first predetermined threshold for detecting a moving block.

The second predetermined threshold may be set as a fixed value from past experiences, or set to a dynamic value based on the movement level of each moving block. For example, the movement levels of the respective moving blocks are arranged in a descending order, and the movement levels of the first 40% are set as the second predetermined threshold (the movement level of the human hand is relatively larger than that of other parts of the body). In this case, the area including the moving blocks having the movement levels of the first 40% of the movement levels arranged in the descending order, can be confirmed as the human hand. In this case, the second predetermined threshold also changes based on the distribution of the movement levels of the respective moving blocks.

In an embodiment, by the following formula, it is possible to quantify the difference between numbers of pixels positioned in respective different depth areas in each of the blocks in the present depth image frame, and numbers of pixels positioned in respective different depth areas in each of the corresponding blocks in each past depth image frame, and to acquire the movement level of each block.

$$C_j = \sum_{i=1}^{K} \left| (N*S_{ji}) * \log \frac{N*S_{ji}}{T_{ji}} \right|, j = 1 \ldots M$$

In the above formula, Cj expresses the movement level of the jth block (j=1, 2, . . . , M), M expresses the number of blocks into which the frame is divided, N expresses the number of past depth image frames, K expresses the number of depth areas, Sji expresses the number of pixels positioned in the ith depth area in the jth block in the present depth image frame (i=1, 2, . . . , K), and Tji expresses a value obtained by adding the number of pixels positioned in the ith depth area in the jth block in each past depth image frame. As a matter of course, it is obvious that the formula for quantifying the movement level of each block is not so limited; any formula, to which the difference between numbers of pixels positioned in respective different depth areas in each of the blocks in the present depth image frame, and numbers of pixels positioned in respective different depth areas in each of the corresponding blocks in each past depth image frame can be applied, may be applied to the present application.

The above are embodiments for detecting the moving object, i.e., the human hand, according to the movement level of each block in the present depth image frame. Furthermore, when it is observed that after the human hand moves for a while, the hand stops and does not move for a certain time, or the movement level is significantly small, for example, the game console uses the staying time of the human hand to trigger an even of clicking one button. In this case, by the conventional movement detection method (for example, a method based on the frame difference), it is not possible to acquire the position of the human hand, which is in a still state or which is moving by a significantly small extent. Therefore, inventors of the present invention have further considered the distribution of the moving blocks in the previous depth image frame, for example, the position and/or the movement level, so that it is possible to further accurately detect a human hand by considering the movement of the human hand (the human hand that is presently likely to be still, or the human hand whose movement level is significantly small).

Therefore, in one embodiment, the part of the present depth image frame to which the human hand belongs is determined by at least one of the position and movement level of the moving blocks in the present depth image frame that have been detected, and the position and movement level of the moving blocks in the previous depth image frame that have been detected previously.

In one embodiment, the detection device performs the following. The step of determining the part of the present depth image frame to which the human hand belongs by at least one of the position and movement level of the moving blocks in the present depth image frame that have been detected, and the position and movement level of the moving blocks in the previous depth image frame that have been detected previously, includes mapping a first moving area in the present depth image frame, based on the position of the first moving area including moving blocks in the previous depth image frame detected previously, and superposing the first moving area on the entirety of or part of a second moving area including moving blocks in the present depth image frame; superposing the movement level of the pixel points in the first moving area after being projected and the movement level of the pixel points in the second moving area, and acquiring an accumulated movement level diagram based on the previous movement; and determining the area satisfying a predetermined condition as the human hand, based on the accumulated movement level diagram based on the previous movement.

In the embodiment, for example, it may be observed that other parts of the human body may move, such as the arm, during the interaction between a human being and a computer. According to experiments, it has been found that movements of the human hand have a special configuration, which are different from movements of other parts of the body. For example, at the same time as the movement of the human hand, the arm also moves. These movements are similar to a single straight line rotating around a fixed point. That is to say, a straight line formed by the human hand and the arm rotates around the elbow or the shoulder, and the movement of the human hand is more rapid than the movement of the arm, the elbow, or the shoulder. Therefore, in the embodiment, a first moving area including moving blocks in (one or more) the previous depth image frame detected previously, is moved, so as to be partly or entirely superposing a second moving area including moving blocks detected in the present depth image frame (so as to be overlapping as much as possible; for example, so that the area of the part where the first moving area and the second moving area or overlapping is maximum). Next, the movement level of the pixel points in the first moving area after being projected and the movement level of the pixel points in the second moving area are superposed, and an accumulated movement level diagram based on a previous movement is acquired. That is to say, it is possible to acquire an accumulated movement level diagram which expresses that the human hand has a large movement level according to the movement level of a moving block obtained as follows. That is to say, when the human hand in the present depth image frame is in a still state, i.e., when it is detected that the block of the part of the human hand in the present depth image frame is still and not moving, the human hand detected in the previous depth image frame (for example, the previous human hand is moving) is superposed on the present human hand, and the movement level of this moving block expresses that the human hand has a large movement level. Therefore, based on the accumulated movement level diagram, an area satisfies a predetermined condition such as various configurations of threshold processing, and the area is determined to be the human hand. As a matter of course, when the present depth image frame is the first frame, there may be a possibility that there is no moving block detected in the previous depth image frame; in this case, this accumulation is not performed, and a human hand is detected simply by using the second predetermined threshold described above.

It is to be noted here that "the moving blocks in the previous depth image frame detected previously" are a different concept from the past depth image frame that is used when detecting the moving blocks in the present depth image frame. The past depth image frame that is used when detecting the moving blocks in the present depth image frame, is at least one past depth image frame that exists before the present depth image frame, and there is a possibility that a moving block is not detected from this at least one past depth image frame. A moving block is detected from one previous depth image frame that is closest to the present depth image frame, and therefore the moving blocks can be recognized in a previous depth image frame that has been detected previously.

As described above, at the same time as the human hand moves, the arm moves, and these movements are similar to a single straight line rotating around a single fixed point, i.e., it has been observed that a straight line constituted by the human hand and the arm rotates around the arm or the shoulder. Therefore, in one embodiment, the step of mapping the first moving area is on the present depth image frame based on the position of the first moving area including the moving blocks in the previous depth image frame that has been detected previously, so that the first moving area entirely or partially overlaps the second moving area including the moving blocks in the present depth image frame, further includes the following steps. That is to say, the above step includes calculating the first main direction, the first center axis line, and the first weighted center of the first moving area based on the position of the moving blocks in the previous depth image frame detected previously, calculating the second main direction, the second center axis line, and the second weighted center of the second moving area based on the position of the moving blocks in the present depth image frame detected, and moving the first moving area such that the first weighted center and the second weighted center entirely or partially overlap each other, the first center axis line and the second center axis line entirely or partially overlap each other, and the first main direction and the second main direction entirely or partially overlap each other.

Here, it is possible to use the known principal component analysis (PCA) for calculating the main direction of an area (see Wikipedia, http://zh.wikipedia.org/wiki/%E4%B8%BB%E6%88%90%E5%88%86%E5%88%86%E6%9E%90). By the PCA algorithm, a dimension having a relatively large distribution can be found in the dimensions, and at the same time, a relatively average dimension can be disregarded. The center axis line can be expressed by a line in which the main direction is located, and the center axis line can be obtained by another known method. Furthermore, to obtain the weighted center, known algorithms may be used, which are not described herein.

The arm and human hand usually rotate around the elbow or the shoulder, and therefore by a digital configuration, it is possible to map a first moving area detected in a previous depth image frame on a second moving area detected in the present depth image frame. In one example, as described above, it is possible to move the first moving area such that the first weighted center and the second weighted center entirely or partially overlap each other, the first center axis line and the second center axis line entirely or partially overlap each other, and the first main direction and the second main direction entirely or partially overlap each other. Here, the first moving area and the second moving area may have different shapes, or there may be a detection error of the moving block. Therefore, regardless of how the first moving area is moved, it may not be possible to make the first weighted center and the second weighted center completely overlap each other, make the first center axis line and the second center axis line completely overlap each other, or make the first main direction and the second main direction completely overlap each other. Accordingly, usually, these are made to partially overlap each other as much as possible, so that the overlapping area is maximum. In one embodiment, for example, it is possible to move the first moving area, to first make the first weighted center and the second weighted center completely overlap each other, make the first center axis line and the second center axis line completely overlap each other, and make the first main direction and the second main direction partially overlap each other, or to first make the first weighted center and the second weighted center completely overlap each other, make the first main direction and the second main direction completely overlap each other, and make the first center axis line and the second center axis line partially overlap each other. For example, as the overlapping standards, the weighted center, the main direction, and the center axis are examples; in other embodiments, the edge of the moving area may also be caused to overlap each other as much as possible.

According to observations, the human hand and the arm continued from the human hand, are usually a long thin shape, and therefore, before detecting the moving area of the human hand, the moving area including all of the moving blocks is filtered in advance, so that the moving area that is most similar to the human hand and/or arm can be found. For example, the first moving area and the second moving area may be areas that satisfy the following conditions. That is, the shape of the moving area constituted by moving blocks is most enlongated, the moving area constituted by moving blocks has the highest similarity with the shape of the arm, the moving area constituted by moving blocks has an oval or a rectangle circumscribed, and the ratio of the long axis and the short axis or the aspect ratio has the highest similarity with the arm. To have an oval or a rectangle circumscribing the moving area is a known geometric arithmetic operation configuration, and specific steps thereof are not described herein.

In one embodiment, the step of determining an area satisfying a predetermined condition as the human hand based on the accumulated movement level diagram based on the previous movement, may include one or more of the following processes. Specifically, the above step may include a process of determining areas having a movement level greater than a third predetermined threshold as an area of the human hand, the movement levels are arranged in a descending order based on the movement levels after the superposing in the accumulated movement level diagram based on the previous movement, and setting a movement level value of a predetermined number as a the third threshold value. The above step may also include a process of using the position of the area of the detected human hand (if any) with respect to the first moving area to estimate the position of the area of the presently detected human hand with respect to the second moving area, and determining the area of the human hand based on the position of the second moving area that is the area of the human hand presently detected. The above step may also include a process in which, based on at least one type of information among the color, the grayscale, and the depth of the human hand, an area is found, which has a similarity that is greater than a predetermined value with respect to the information.

As a matter of course, there may be another configuration of determining the area of the human hand according to features of the human hand, in the accumulated movement level diagram of movements. For example, an area which has a relatively large movement level, and which has a thicker shape than other parts, may be determined as the human hand (because the human hand is usually thicker than the arm). The examples in the present application are merely examples, and do not limit the present invention.

As described above, according to embodiments of the present invention, according to the difference between numbers of pixels positioned in respective different depth areas in each of the blocks in the present depth image frame, and numbers of pixels positioned in respective different depth areas in each of the corresponding blocks in each past depth image frame, it is possible to find an area of a moving object. Furthermore, according to the detection status of a previous moving block and/or features such as the shape, the color, the grayscale, and the depth of the human hand, it is possible to detect the area of the human hand more accurately.

In the present application, block diagrams of the device, equipment, and system are merely examples, and do not necessarily require or imply that connections, arrangements, dispositions are made based on the configuration of the block diagram. The device, equipment, and system may be connected, arranged, and disposed by an arbitrary configuration so as to be understood by those skilled in the art. For example, "provided with", "including", "having" are open terms, and indicate "includes but is not limited to", and may be replaced by "includes but is not limited to". Furthermore, the terms "or" and "and" used herein indicate "and/or", and may be replaced by "and/or", unless otherwise specified in descriptions before and after the term. The term "for example" used herein indicates "for example, but is not limited to", and may be replaced by "for example, but is not limited to".

In the present application, the step flowcharts and methods are merely examples, and do not require or imply that the steps of the embodiments need to be performed in the indicated order. The steps of the embodiments may be performed in any arbitrary order so as to be understood by those skilled in the art. For example, terms such as "after", "next", "subsequently" do not limit the order of the steps; these terms are only used for guiding the reader to read through the description of the method. Furthermore, articles such as "one", "a", "the" which are used for a single element are not to be interpreted as limiting the element to be singular.

Descriptions of the disclosed aspects may be provided so that any one skilled in the art may produce or use the present invention. Various modifications to these aspects may be easily conceived by those skilled in the art, and the general principle defined herein may be applied to other aspects without departing from the scope of the present invention. Therefore, the present invention is not limited to the aspects indicated herein; the present invention has the largest scope by which the principle disclosed herein matches new features.

The above description is made for providing examples and explanations. Furthermore, embodiments of the present invention are not limited to the disclosed formats. In the above, a plurality of examples and embodiments are discussed, and deformations, corrections, modifications, additions, and sub-combinations may be made by those skilled in the art. The operations of the above method may performed by any appropriate means that can execute corresponding functions. The means may include various hardware and/or a software assembly and/or modules, and may include a circuit and exclusive-use integrated circuits (ASIC), or a processor, although the present invention is not so limited.

The elements described and used for performing the functions described herein, such as a general-purpose processor, a digital signal processor (DSP), an ASIC, a field programmable gate array signal (FPGA), another programmable logic device (PLD), a discrete gate or transistor logic, a discrete hardware assembly or arbitrary combinations thereof, may be used to realize or execute the logic blocks, the modules, and the circuits of the above-described examples. The general-purpose processor may be a microprocessor, and may alternatively be any processor, controller, micro controller, or state machine, which is commercially available. The processor may be realized as a combination of calculation devices, such as a combination of DSP and a microprocessor, a plurality of microprocessors, one or more microprocessors cooperating with a DSP, or other such devices.

The steps of the method or algorithms described in the present application may be incorporated directly in the hardware, or software modules executed by the processor, or a combination of the hardware and software modules. The software modules may be included in a physical storage medium of any configuration. Examples of the storage medium that may be used are a random access memory (RAM) a read-only memory (ROM), a flash memory, an EPROM memory, an EEPROM memory, a register, a hard disk, a portable disk, and a CD-ROM. The storage medium is coupled with a processor, and the processor reads information from the storage medium and writes information in the storage medium. As an alternative configuration, the storage medium may be integrated with a processor. The software module may be a single instruction or multiple instructions, or may be distributed in different programs in different code sections, and may be included across plural storage media.

The method disclosed herein includes one or more operations for realizing the method. The method and/or the operations are compatible, without departing from the scope of the present invention. That is to say, unless a specific order of the operations is specified, the order of the specific operations may be modified and/or used, without departing from the scope of the present invention.

The above-described functions may be realized based on hardware, software, firmware, or arbitrary combinations thereof. When the function is realized by software, the function may be stored in an appropriate computer-readable medium as one or more instructions. The storage medium may be any usable appropriate medium that may access a computer (site). Non-limiting examples of the computer-readable medium are RAM, ROM, EEPROM, CD-ROM, or other optical disks, diskettes, or other storage devices, or any other appropriate medium that may carry or store a desired program code of an instruction or data format and access a computer (site). For example, a disk or disc includes a compact disc (CD), a laser disc, an optical disc, a digital versatile disk (DVD), a floppy disk, and a Blu-ray disc. Among these, a disk magnetically reproduces data, and a disc optically reproduces data by using laser light.

Therefore, a computer program product may perform operations provided herein. For example, the computer program product may be a computer-readable physical medium physically storing (and/or encoding) an instruction, and the instruction may execute the operations described herein by one or more processors. The computer program product may include packing materials.

The software or instruction may be transmitted by a transmission medium. For example, the software may be transmitted by a coaxial cable, an optical fiber cable, a twisted pair cable, a digital subscriber line (DSL), or a website, a server, or other remote resources, by a transmission medium of a wireless technology using infrared, wireless, or microwaves.

Furthermore, the modules and/or other appropriate means for performing the method and technology described herein, may be downloaded and/or acquired by other configurations from a user terminal and/or a base station. For example, this kind of equipment is coupled with a server and promotes the transmission of the means for performing the method described herein. Alternatively, various methods described herein may be provided via a storage member (for example, a physical storage medium such as a RAM, a ROM, a CD, or a floppy disk). The user terminal and/or a base station is coupled with the equipment, and causes the equipment to acquire various methods for providing the storage member. Furthermore, any appropriate technology may be used, for providing the methods and technology described herein to the equipment.

Other examples and embodiments are within the scope and the effects of the present application. For example, according to the essence of software, the above functions may be realized by software executed by a processor, hardware, firmware, hard wire, or an arbitrary combination thereof. The features for realizing the functions may be physically located at the respective positions, or the features may be distributed such that part of the functions are physically located at different positions. Furthermore, in a claim starting with "at least one", "or" means to separate the elements; for example, "at least one of A, B, or C" means A or B or C, or AB or AC or BC, or ABC (i.e., A, B, and C). Furthermore, a described "example" does not mean that this example is preferable or better than other examples.

The moving object detection method and system according to embodiments of the present invention are not limited to the specific embodiments described herein, and variations and modifications may be made without departing from the spirit and scope of the present invention. Furthermore, the present application and the scope of the present invention are not limited to the specific aspects of the above-described processes, devices, manufacturing methods, configurations of events, means, methods, and operations. It is possible to use processes, devices, manufacturing methods, configurations of events, means, methods, and operations, which implement basically the same functions as the aspects described herein, or implement basically the same results as the aspects described herein, or presently provide or later develop the same results as the aspects described herein. Therefore, the scope of the claims include such processes, devices, manufacturing methods, configurations of events, means, methods, and operations.

The present application is based on and claims the benefit of priority of Chinese Priority Patent Application No. 201310365452.5, filed on Aug. 21, 2013, the entire contents of which are hereby incorporated herein by reference.

What is claimed is:

1. A moving object detection method comprising:
  acquiring at least two depth image frames including depth information, which are obtained by continuously taking images of a moving object, the at least two depth image frames including a present depth image frame and at least one past depth image frame;
  dividing each of the at least two depth image frames into a plurality of blocks;
  calculating differences between numbers of pixels positioned in respective different depth areas in each of the plurality of blocks in the present depth image frame, and numbers of pixels positioned in respective different depth areas in each of the corresponding plurality of blocks in each of the at least one past depth image frame, which correspond to the plurality of blocks in the present depth image frame; and
  detecting a moving block in the present depth image frame based on the calculated differences, and constituting a detected moving object, with the moving block, wherein
  the detecting of the moving block includes
    determining which part of the present depth image frame belongs to a human hand, based on a position and a movement level of each of the moving blocks in the present depth image frame detected presently, and a position and a movement level of each of the moving blocks in at least one previous depth image frame detected previously, and wherein
  the determining of the part of the present depth image frame that belongs to the human hand, includes
    mapping a first moving area in the present depth image frame, based on a position of the first moving area constituted by the moving blocks in the previous depth image frame detected previously, such that the first moving area entirely or partially overlaps a second moving area constituted by the moving blocks in the present depth image frame,
    superposing a movement level of each pixel point in the first moving area which has been mapped, on a movement level of each pixel point in the second moving area, and acquiring an accumulated movement level diagram based on a previous movement, and
    determining an area as the human hand when the area satisfies a predetermined condition, based on the accumulated movement level diagram based on the previous movement.

2. The moving object detection method according to claim 1, wherein
  the detecting of the moving block includes
    quantifying a degree of the difference in the numbers of pixels in each of the plurality of blocks between the present depth image frame and each of the at least one past depth image frame, and calculating the movement level of each of the plurality of blocks in the present depth image frame, and detecting one of the plurality of blocks whose movement level is greater than or equal to a first predetermined threshold, and setting the detected one of the plurality of blocks as the moving block.

3. The moving object detection method according to claim 2, wherein
the detecting of the moving block includes
detecting one of the plurality of blocks whose movement level is greater than or equal to a second predetermined threshold in the present depth image frame, and determining that the detected one of the plurality of blocks belongs to part of a human hand.

4. The moving object detection method according to claim 1, wherein
the mapping of the first moving area on the second moving area includes
calculating a first main direction, a first center axis line, and a first weighted center of the first moving area, based on the positions of the moving blocks in the previous depth image frame detected previously,
calculating a second main direction, a second center axis line, and a second weighted center of the second moving area, based on the positions of the moving blocks in the present depth image frame, and
moving the first moving area such that the first weighted center and the second weighted center entirely or partially overlap each other, the first center axis line and the second center axis line entirely or partially overlap each other, and the first main direction and the second main direction entirely or partially overlap each other.

5. The moving object detection method according to claim 4, wherein
the first moving area and the second moving area are moving areas that satisfy at least one of conditions including
the moving area constituted by the moving blocks has a longest and thinnest shape,
the moving area constituted by the moving blocks has a maximum similarity with a shape of an arm, and
the moving area constituted by the moving blocks is circumscribed by an oval or a rectangle, and a ratio of a long axis and a short axis or an aspect ratio of the oval or the rectangle has a maximum similarity with the arm.

6. The moving object detection method according to claim 1, wherein
the determining of the area satisfying the predetermined condition as the human hand includes
determining an area whose movement level is greater than a third predetermined threshold as the area of the human hand, wherein the third predetermined threshold is obtained by arranging movement levels in a descending order based on the movement levels that have been superposed in the accumulated movement level diagram based on the previous movement, and setting a movement level of a predetermined rank among the arranged movement levels, as the third predetermined threshold,
estimating a position of an area of the human hand presently detected with respect to the second moving area, by using a position of an area of the human hand previously detected with respect to the first moving area, and determining the area of the human hand based on the estimated position of the area of the human hand presently detected with respect to the second moving area, and finding an area having a similarity that is greater than a predetermined value with respect to information, the information including at least one of a color, a grayscale, and a depth of the human hand.

7. The moving object detection method according to claim 6, further comprising:
calculating the movement level of each of the plurality of blocks by a formula of $$C_j = \sum_{i=1}^{K} \left| (N * S_{ji}) * \log \frac{N * S_{ji}}{T_{ji}} \right|, j = 1 \ldots M,$$

wherein $C_j$ expresses a movement level of a jth block ($j=1, 2, \ldots, M$), M expresses a number of blocks into which each of the at least two depth image frames is divided, N expresses a number of the at least one past depth image frame, K expresses a number of the different depth areas, $S_{ji}$ expresses a number of pixels positioned in an ith depth area in the jth block in the present depth image frame ($i=1, 2, \ldots, K$), and $T_{ji}$ expresses a value obtained by adding the numbers of pixels positioned in the ith depth area in the jth block in the respective at least one past depth image frames.

8. A moving object detection system comprising:
an acquisition device configured to acquire at least two depth image frames including depth information, which are obtained by continuously taking images of a moving object, the at least two depth image frames including a present depth image frame and at least one past depth image frame, and to divide each of the at least two depth image frames into a plurality of blocks;
a calculation device configured to calculate differences between numbers of pixels positioned in respective different depth areas in each of the plurality of blocks in the present depth image frame, and numbers of pixels positioned in respective different depth areas in each of the corresponding plurality of blocks in each of the at least one past depth image frame, which correspond to the plurality of blocks in the present depth image frame; and
a detection device configured to detect a moving block in the present depth image frame based on the calculated differences, and to constitute a detected moving object, with the moving block, wherein
the detection device is configured to
determine which part of the present depth image frame belongs to a human hand, based on a position and a movement level of each of the moving blocks in the present depth image frame detected presently, and a position and a movement level of each of the moving blocks in at least one previous depth image frame detected previously, and wherein
the detection device is configured to determine the part of the present depth image frame that belongs to the human hand, by
mapping a first moving area in the present depth image frame, based on a position of the first moving area constituted by the moving blocks in the previous depth image frame detected previously, such that the first moving area entirely or partially overlaps a second moving area constituted by the moving blocks in the present depth image frame,
superposing a movement level of each pixel point in the first moving area which has been mapped, on a movement level of each pixel point in the second moving area, and acquiring an accumulated movement level diagram based on a previous movement, and determining an area as the human hand when the area satisfies a predetermined condition, based on the accumulated movement level diagram based on the previous movement.

9. The moving object detection system according to claim 8, wherein the detection device is configured to quantify a degree of the difference in the numbers of pixels in each of the plurality of blocks between the present depth image frame and each of the at least one past depth image frame, and calculate the movement level of each of the plurality of blocks in the present depth image frame, and detect one of the plurality of blocks whose movement level is greater than or equal to a first predetermined threshold, and set the detected one of the plurality of blocks as the moving block.

10. The moving object detection system according to claim 9, wherein the detection device is configured to detect one of the plurality of blocks whose movement level is greater than or equal to a second predetermined threshold in the present depth image frame, and determine that the detected one of the plurality of blocks belongs to part of a human hand.

11. The moving object detection system according to claim 8, wherein the detection device is configured to map the first moving area on the second moving area by calculating a first main direction, a first center axis line, and a first weighted center of the first moving area, based on the positions of the moving blocks in the previous depth image frame detected previously, calculating a second main direction, a second center axis line, and a second weighted center of the second moving area, based on the positions of the moving blocks in the present depth image frame, and moving the first moving area such that the first weighted center and the second weighted center entirely or partially overlap each other, the first center axis line and the second center axis line entirely or partially overlap each other, and the first main direction and the second main direction entirely or partially overlap each other.

12. The moving object detection system according to claim 11, wherein the first moving area and the second moving area are moving areas that satisfy at least one of conditions including the moving area constituted by the moving blocks has a longest and thinnest shape, the moving area constituted by the moving blocks has a maximum similarity with a shape of an arm, and the moving area constituted by the moving blocks is circumscribed by an oval or a rectangle, and a ratio of a long axis and a short axis or an aspect ratio of the oval or the rectangle has a maximum similarity with the arm.

13. The moving object detection system according to claim 8, wherein the detection device is configured to determine the area satisfying the predetermined condition as the human hand, by determining an area whose movement level is greater than a third predetermined threshold as the area of the human hand, wherein the third predetermined threshold is obtained by arranging movement levels in a descending order based on the movement levels that have been superposed in the accumulated movement level diagram based on the previous movement, and setting a movement level of a predetermined rank among the arranged movement levels, as the third predetermined threshold, estimating a position of an area of the human hand presently detected with respect to the second moving area, by using a position of an area of the human hand previously detected with respect to the first moving area, and determining the area of the human hand based on the estimated position of the area of the human hand presently detected with respect to the second moving area, and finding an area having a similarity that is greater than a predetermined value with respect to information, the information including at least one of a color, a grayscale, and a depth of the human hand.

14. The moving object detection system according to claim 13, wherein the detection device is configured to calculate the movement level of each of the plurality of blocks by a formula of $$C_j = \sum_{i=1}^{K} \left| (N * S_{ji}) * \log \frac{N * S_{ji}}{T_{ji}} \right|, j = 1 \ldots M,$$

wherein $C_j$ expresses a movement level of a jth block (j=1, 2, ..., M), M expresses a number of blocks into which each of the at least two depth image frames is divided, N expresses a number of the at least one past depth image frame, K expresses a number of the different depth areas, $S_{ji}$ expresses a number of pixels positioned in an ith depth area in the jth block in the present depth image frame (i=1, 2, ..., K), and $T_{ji}$ expresses a value obtained by adding the numbers of pixels positioned in the ith depth area in the jth block in the respective at least one past depth image frames.

* * * * *